US011178681B2

(12) United States Patent
Wang et al.

(10) Patent No.: US 11,178,681 B2
(45) Date of Patent: Nov. 16, 2021

(54) RESOURCE SCHEDULING METHOD AND DEVICE

(71) Applicant: HUAWEI TECHNOLOGIES CO., LTD., Guangdong (CN)

(72) Inventors: Tingting Wang, Shenzhen (CN); Qufang Huang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/673,205

(22) Filed: Nov. 4, 2019

(65) Prior Publication Data

US 2020/0068601 A1    Feb. 27, 2020

Related U.S. Application Data

(63) Continuation of application No. PCT/CN2018/083576, filed on Apr. 18, 2018.

(30) Foreign Application Priority Data

May 5, 2017    (CN) .......................... 201710314147.1

(51) Int. Cl.
*H04W 72/12* (2009.01)

(52) U.S. Cl.
CPC ... *H04W 72/1268* (2013.01); *H04W 72/1221* (2013.01); *H04W 72/1242* (2013.01)

(58) Field of Classification Search
USPC ................................................. 370/329–330
See application file for complete search history.

(56) References Cited

U.S. PATENT DOCUMENTS

2006/0268798 A1* 11/2006 Kim .................. H04W 72/1278
                                                                370/338
2015/0078231 A1*  3/2015 Bergstrom ........ H04W 72/1268
                                                                370/311

(Continued)

FOREIGN PATENT DOCUMENTS

CN         106231614 A      12/2016
CN         106550439 A       3/2017

OTHER PUBLICATIONS

"Discussion on SR and BSR in NR" to ASUSTeK 3GPP TSG-RAN WG2 Meeting #97 R2-1701448 Athens, Greece, Feb. 13-17, 2017 (Year: 2017).*

(Continued)

*Primary Examiner* — Nathan S Taylor
(74) *Attorney, Agent, or Firm* — Womble Bond Dickinson (US) LLP

(57) ABSTRACT

Embodiments of this application provide a resource scheduling method, which includes: transmitting, by a terminal device, at least first indication information to a network device on a pre-allocated uplink resource, where the first indication information indicates a data volume of to-be-transmitted data of the terminal device; and transmitting the to-be-transmitted data on an uplink resource if the terminal device receives at least second indication information transmitted by the network device, where the second indication information indicates the uplink resource allocated by the network device to the terminal device. In the embodiments of this application, when to-be-transmitted data is MBB service data, the terminal device may transmit a data volume of the MBB service data to the network device on a grant-free resource, so that the network device allocates an uplink resource to the terminal device and the terminal (Continued)

device transmits the MBB service data on the uplink resource.

16 Claims, 19 Drawing Sheets

(56) References Cited

U.S. PATENT DOCUMENTS

| | | | |
|---|---|---|---|
| 2015/0245349 A1* | 8/2015 | Jha | H04W 28/0278 |
| | | | 370/329 |
| 2016/0100430 A1* | 4/2016 | Dabeer | H04W 72/08 |
| | | | 370/329 |
| 2016/0270102 A1* | 9/2016 | Zeng | H04W 72/048 |
| 2017/0208610 A1* | 7/2017 | Tang | H04W 72/1205 |
| 2017/0367110 A1* | 12/2017 | Li | H04W 74/0816 |
| 2018/0054755 A1* | 2/2018 | Lee | H04W 28/0278 |
| 2018/0084568 A1* | 3/2018 | Wei | H04W 72/085 |
| 2018/0098250 A1* | 4/2018 | Vrzic | H04W 36/18 |
| 2018/0176937 A1* | 6/2018 | Chen | H04W 74/085 |
| 2018/0176945 A1* | 6/2018 | Cao | H04W 72/1268 |
| 2018/0270699 A1* | 9/2018 | Babaei | H04W 72/1284 |
| 2018/0317123 A1* | 11/2018 | Chen | H04W 72/1284 |
| 2018/0323909 A1* | 11/2018 | Ying | H04L 1/0072 |
| 2018/0359711 A1* | 12/2018 | Akkarakaran | H04W 52/325 |
| 2018/0368117 A1* | 12/2018 | Ying | H04L 5/0044 |
| 2019/0007963 A1* | 1/2019 | Akkarakaran | H04W 72/0406 |
| 2019/0069253 A9* | 2/2019 | Nory | H04W 72/1284 |
| 2019/0159240 A1* | 5/2019 | Lohr | H04W 72/042 |
| 2019/0166625 A1* | 5/2019 | Nam | H04L 1/0058 |
| 2019/0200214 A1* | 6/2019 | Liu | H04W 72/042 |
| 2019/0281622 A1* | 9/2019 | Hwang | H04W 72/1273 |
| 2019/0297635 A1* | 9/2019 | Wu | H04L 1/1893 |
| 2019/0319762 A1* | 10/2019 | Zhang | H04L 5/0091 |
| 2019/0327727 A1* | 10/2019 | Wu | H04W 72/0413 |
| 2019/0394000 A1* | 12/2019 | Kim | H04L 5/0053 |
| 2020/0045694 A1* | 2/2020 | Yan | H04W 72/0413 |
| 2020/0059935 A1* | 2/2020 | Qian | H04W 74/02 |
| 2020/0092685 A1* | 3/2020 | Fehrenbach | H04B 7/2606 |
| 2020/0107189 A1* | 4/2020 | Sharma | H04W 36/0038 |
| 2020/0245361 A1* | 7/2020 | Xiong | H04W 74/0833 |
| 2020/0288482 A1* | 9/2020 | Yi | H04W 72/121 |
| 2020/0351839 A1* | 11/2020 | Luo | H04L 5/001 |

OTHER PUBLICATIONS

Asustek, "Discussion on SR and BSR in NR", 3GPP TSG-RAN WG2 Meeting #97, R2-1701448, Athens, Greece, Feb. 13-17, 2017, total 4 pages.

NTT Docomo et al.: "on eMBB and URLLC multiplexing for uplink", 3GPP Draft; R1-1705754, Apr. 2, 2017 (Apr. 2, 2017), XP051243869, total 4 pages.

CATT: "URLLC HARQ operation", 3GPP Draft; R1-1700205, Jan. 16, 2017 (Jan. 16, 2017), XP051207744, total 4 pages.

Institute for Information Industry (II I) : "Combined SR with BSR for reducing UP 1 atency", 3GPP Draft; R2-154411, Oct. 4, 2015 (Oct. 4, 2015), XP051004982, total 4 pages.

Huawei Hisilicon: "Considerations on grant free transmission for NR", 3GPP Draft; R2-168478, Nov. 13, 2016 (Nov. 13, 2016), XP051178068, total 2 pages.

3GPP TS 36. 321, V14. 2. 1,:'113rd Generation Partnership Project;Technical Specification Group Radio AccessNetwork, Evolved Universal TerrestrialRadio Access (E-UTRA); Medium AccessControl (MAC) protocol specification (Release 14)', Apr. 27, 2017 (Apr. 27, 2017), pp. 1-106, XP051298198, total 106 pages.

* cited by examiner

RESOURCE SCHEDULING METHOD AND DEVICE

CROSS-REFERENCE TO RELATED APPLICATIONS

This application is a continuation of International Application No. PCT/CN2018/083576, filed on Apr. 18, 2018, which claims priority to Chinese Patent Application No. 201710314147.1, filed on May 5, 2017. The disclosures of the aforementioned applications are hereby incorporated by reference in their entireties.

TECHNICAL FIELD

This application relates to communications technologies, and in particular, to a resource scheduling method and a device.

BACKGROUND

In a fifth-generation (5G) mobile communications technology system, an ultra-reliable low latency communications (URLLC) service is introduced. The URLLC service may prefer and/or require a data transmission latency to be less than 0.5 ms and may prefer and/or require a data transmission success probability to be greater than or equal to 99.999%. In current discussions on 5G standards, a solution of performing uplink transmission of URLLC service data by using a grant-free resource has been adopted. The grant-free resource is a resource that enables a terminal device to perform data transmission in an arrive-and-go manner. The network device pre-allocates some grant-free resources to the terminal device. Once URLLC service data arrives at the terminal device, the terminal device immediately transmits the data on a next grant-free resource without transmitting a scheduling request (SR) to a network device or requiring the network device to schedule an uplink resource for the terminal device and to deliver an uplink scheduling grant UL grant.

In a long term evolution (LTE) system, the network device allocates a scheduling request (SR) resource to the terminal device, and the terminal device can apply to the network device for an uplink resource by transmitting an SR on the SR resource, and transmit mobile broadband (MBB) service data on the uplink resource allocated by the network device to the terminal device.

The prior art has not provided a clear mechanism to resolve how the terminal device uses the grant-free resource to apply for the uplink resource or transmit data such as URLLC service data and MBB service data when the terminal device supports both the 5G communications system and the LTE communications system.

SUMMARY

Embodiments of this application provide a resource scheduling method and a device to implement a mechanism for a terminal device to apply for an uplink resource or transmit data by using a grant-free resource.

According to one embodiment, this application provides a resource scheduling method, and the method includes:

transmitting, by a terminal device, at least first indication information to a network device on a pre-allocated uplink resource, where the first indication information is used to indicate a data volume of to-be-transmitted data of the terminal device; and transmitting the to-be-transmitted data on an uplink resource if the terminal device receives at least second indication information transmitted by the network device, where the second indication information is used to indicate the uplink resource allocated by the network device to the terminal device.

In one embodiment, the transmitting, by a terminal device, at least first indication information to a network device on a pre-allocated uplink resource includes:

transmitting, by the terminal device, the first indication information to the network device on the pre-allocated uplink resource if a buffer of the terminal device includes first service data and the pre-allocated uplink resource corresponding to the terminal device is used to transmit at least the first indication information.

In one embodiment, the first indication information is used to indicate a data volume of the first service data.

In one embodiment, the method further includes:

retransmitting the first indication information on a next pre-allocated uplink resource if the second indication information transmitted by the network device is not received by the terminal device before arrival of the next pre-allocated uplink resource of the pre-allocated uplink resource.

In one embodiment, the method further includes:

initiating a random access process if a quantity of times of transmitting the first indication information by the terminal device reaches a preset quantity of times; or initiating a random access process if the second indication information transmitted by the network device is not received when a quantity of times of transmitting the first indication information by the terminal device reaches a preset quantity of times.

In one embodiment, after the transmitting, by a terminal device, at least first indication information to a network device on a pre-allocated uplink resource, the method further includes:

transmitting, by the terminal device, scheduling request information to the network device on a scheduling request resource allocated by the network device;

retransmitting the first indication information on a next pre-allocated uplink resource if the second indication information transmitted by the network device is not received by the terminal device before arrival of the next pre-allocated uplink resource of the pre-allocated uplink resource; and retransmitting the scheduling request information on a next scheduling request resource if the second indication information transmitted by the network device is not received by the terminal device before arrival of the next scheduling request resource of the scheduling request resource.

In one embodiment, the method further includes:

transmitting, if a quantity of times of transmitting the first indication information by the terminal device reaches a preset quantity of times, scheduling request information to the network device on a scheduling request resource allocated by the network device; or transmitting, if the second indication information transmitted by the network device is not received when a quantity of times of transmitting the first indication information by the terminal device reaches a preset quantity of times, scheduling request information to the network device on a scheduling request resource allocated by the network device.

In one embodiment, after transmitting the scheduling request information to the network device on a scheduling request resource allocated by the network device, the method further includes:

retransmitting the scheduling request information on a next scheduling request resource if the second indication information transmitted by the network device is not received by the terminal device before arrival of the next scheduling request resource of the scheduling request resource;

initiating a random access process if a quantity of times of transmitting the scheduling request information by the terminal device reaches a preset quantity of times; or initiating a random access process if the second indication information transmitted by the network device is not received when a quantity of times of transmitting the scheduling request information by the terminal device reaches a preset quantity of times.

In one embodiment, the transmitting, by a terminal device, at least first indication information to a network device on a pre-allocated uplink resource includes:

transmitting, by the terminal device, the first indication information and a part of the first service data to the network device on the pre-allocated uplink resource.

In one embodiment, the transmitting the to-be-transmitted data on an uplink resource if the terminal device receives at least second indication information transmitted by the network device includes:

transmitting a remaining part of the first service data on the uplink resource if the terminal device receives an acknowledgment feedback of the network device on the part of the first service data before receiving the second indication information transmitted by the network device; or transmitting the first service data on the uplink resource if the terminal device does not receive an acknowledgment feedback of the network device on the part of the first service data before receiving the second indication information transmitted by the network device.

In one embodiment, the method further includes:

retransmitting the first indication information and the part of the first service data on a next pre-allocated uplink resource if the second indication information transmitted by the network device is not received by the terminal device before arrival of the next pre-allocated uplink resource of the pre-allocated uplink resource.

In one embodiment, the method further includes:

initiating a random access process if a quantity of times of transmitting the first indication information and the part of the first service data by the terminal device reaches a preset quantity of times; or initiating a random access process if the second indication information transmitted by the network device is not received when a quantity of times of transmitting the first indication information and the part of the first service data by the terminal device reaches a preset quantity of times.

In one embodiment, the transmitting, by a terminal device, at least first indication information to a network device on a pre-allocated uplink resource includes:

transmitting, by the terminal device, second service data and the first indication information to the network device on the pre-allocated uplink resource, where a priority of the second service data is higher than a priority of the first service data.

In one embodiment, after the transmitting, by the terminal device, second service data and the first indication information to the network device on the pre-allocated uplink resource, the method further includes:

transmitting, by the terminal device if the second indication information transmitted by the network device is not received by the terminal device in a preset time period, scheduling request information to the network device on a scheduling request resource allocated by the network device; and determining, by the terminal device if a next pre-allocated uplink resource of the pre-allocated uplink resource is received by the terminal device in a preset time period, whether to retransmit the second service data and the first indication information on the next pre-allocated uplink resource.

In one embodiment, the determining, by the terminal device, whether to retransmit the second service data and the first indication information on the next pre-allocated uplink resource includes:

determining, by the terminal device, based on a size of the second service data and the first indication information as well as a latency budget of the second service data, whether to retransmit the second service data and the first indication information on the next pre-allocated uplink resource.

In one embodiment, the determining, by the terminal device, based on a size of the second service data and the first indication information as well as a latency budget of the second service data, whether to retransmit the second service data and the first indication information on the next pre-allocated uplink resource includes:

determining to retransmit the second service data and the first indication information on the next pre-allocated uplink resource if the size of the second service data and the first indication information is less than or equal to a size of the next pre-allocated uplink resource;

determining to transmit a part of the second service data and the first indication information on the next pre-allocated uplink resource if the size of the second service data and the first indication information is larger than a size of the next pre-allocated uplink resource and a latency budget of the second service data is greater than a preset latency; and determining to transmit the second service data on the next pre-allocated uplink resource if the size of the second service data and the first indication information is larger than a size of the next pre-allocated uplink resource and a latency budget of the second service data is less than a preset latency.

In one embodiment, the transmitting the to-be-transmitted data on an uplink resource if the terminal device receives at least second indication information transmitted by the network device includes:

transmitting the second service data on an uplink resource if the terminal device receives the second indication information transmitted by the network device and receives the second service data before arrival of the uplink resource indicated by the second indication information; and transmitting the first service data on an uplink resource if the terminal device receives the second indication information transmitted by the network device and receives no second service data before arrival of the uplink resource indicated by the second indication information.

In one embodiment, the method further includes:

initiating a random access process if a sum of a quantity of times of transmitting the first indication information and a quantity of times of transmitting the scheduling request information by the terminal device reaches a preset quantity of times; or initiating a random access process if the second indication information transmitted by the network device is not received when a sum of a quantity of times of transmitting the first indication information and a quantity of times of transmitting the scheduling request information by the terminal device reaches a preset quantity of times.

In one embodiment, the first indication information is used to indicate a data volume of the second service data.

In one embodiment, the transmitting, by a terminal device, at least first indication information to a network device on a pre-allocated uplink resource includes:

transmitting, by the terminal device, the first indication information and a part of the second service data to the network device on the pre-allocated uplink resource when a size of the pre-allocated uplink resource is smaller than a size of the second service data.

In one embodiment, the method further includes:

transmitting, by the terminal device, the second service data to the network device on the pre-allocated uplink resource if the size of the pre-allocated uplink resource is greater than or equal to a size of the second service data.

In one embodiment, the method further includes:

transmitting, by the terminal device, a remaining part of the second service data to the network device on a next pre-allocated uplink resource of the pre-allocated uplink resource or on a next uplink resource of the uplink resource when the size of the pre-allocated uplink resource is smaller than a size of the second service data.

In one embodiment, the first service data includes at least mobile broadband MBB service data, and the second service data includes at least ultra-reliable low latency communication URLLC service data.

According to one embodiment, this application provides a terminal device, including a transmission module and a receiving module.

The transmission module is configured to transmit at least first indication information to a network device on a pre-allocated uplink resource, where the first indication information is used to indicate a data volume of to-be-transmitted data of the terminal device.

When the receiving module receives at least second indication information transmitted by the network device, where the second indication information is used to indicate an uplink resource allocated by the network device to the terminal device, the transmission module is further configured to transmit the to-be-transmitted data on the uplink resource.

In one embodiment, the terminal device further includes a storage module.

If the storage module stores first service data and a pre-allocated uplink resource corresponding to the terminal device is used to transmit at least the first indication information, the transmission module transmits the first indication information to the network device on the pre-allocated uplink resource.

In one embodiment, the first indication information is used to indicate a data volume of the first service data.

In one embodiment, the transmission module retransmits the first indication information on a next pre-allocated uplink resource if the second indication information transmitted by the network device is not received by the receiving module before arrival of the next pre-allocated uplink resource of the pre-allocated uplink resource.

In one embodiment, the terminal device further includes a processing module.

If a quantity of times of transmitting the first indication information by the transmission module reaches a preset quantity of times, the processing module is configured to initiate a random access process through the transmission module.

Alternatively, if the second indication information transmitted by the network device is not received by the receiving module when a quantity of times of transmitting the first indication information by the transmission module reaches a preset quantity of times, the processing module is configured to initiate a random access process through the transmission module.

In one embodiment, after transmitting at least the first indication information to the network device on the pre-allocated uplink resource, the transmission module is further configured to transmit scheduling request information to the network device on a scheduling request resource allocated by the network device.

The transmission module is further configured to retransmit the first indication information on a next pre-allocated uplink resource if the second indication information transmitted by the network device is not received by the receiving module before arrival of the next pre-allocated uplink resource of the pre-allocated uplink resource.

The transmission module is further configured to retransmit the scheduling request information on a next scheduling request resource if the second indication information transmitted by the network device is not received by the receiving module before arrival of the next scheduling request resource of the scheduling request resource.

In one embodiment, if a quantity of times of transmitting the first indication information by the transmission module reaches a preset quantity of times, the transmission module transmits scheduling request information to the network device on a scheduling request resource allocated by the network device.

Alternatively, if the second indication information transmitted by the network device is not received by the receiving module when a quantity of times of transmitting the first indication information by the transmission module reaches a preset quantity of times, the transmission module transmits scheduling request information to the network device on a scheduling request resource allocated by the network device.

In one embodiment, the transmission module is specifically configured to transmit the first indication information and a part of the first service data to the network device on the pre-allocated uplink resource.

In one embodiment, the transmission module retransmits the first indication information and the part of the first service data on a next pre-allocated uplink resource if the second indication information transmitted by the network device is not received by the receiving module before arrival of the next pre-allocated uplink resource of the pre-allocated uplink resource.

In one embodiment, the terminal device further includes a processing module.

If a quantity of times of transmitting the first indication information and the part of the first service data by the transmission module reaches a preset quantity of times, the processing module is configured to initiate a random access process through the transmission module.

Alternatively, if the second indication information transmitted by the network device is not received by the receiving module when a quantity of times of transmitting the first indication information and the part of the first service data by the transmission module reaches a preset quantity of times, the processing module is configured to initiate a random access process through the transmission module.

In one embodiment, the transmission module is specifically configured to transmit second service data and the first indication information to the network device on the pre-allocated uplink resource, where a priority of the second service data is higher than a priority of the first service data.

In one embodiment, the terminal device further includes a processing module.

After the transmission module transmits the second service data and the first indication information to the network device on the pre-allocated uplink resource, if the second indication information transmitted by the network device is not received by the receiving module in a preset time period, the transmission module transmits scheduling request information to the network device on a scheduling request resource allocated by the network device; if the receiving module receives a next pre-allocated uplink resource of the pre-allocated uplink resource in a preset time period, the processing module determines whether to retransmit the second service data and the first indication information on the next pre-allocated uplink resource through the transmission module.

In one embodiment, if a sum of a quantity of times of transmitting the first indication information by the transmission module and a quantity of times of transmitting the scheduling request information reaches a preset quantity of times, the processing module initiates a random access process through the transmission module.

Alternatively, if the second indication information transmitted by the network device is not received by the receiving module when a sum of a quantity of times of transmitting the first indication information by the transmission module and a quantity of times of transmitting the scheduling request information reaches a preset quantity of times, the processing module initiates a random access process through the transmission module.

In one embodiment, the first indication information is used to indicate a data volume of the second service data.

In one embodiment, the first service data includes at least mobile broadband MBB service data, and the second service data includes at least ultra-reliable low latency communication URLLC service data.

According to one embodiment, this application provides a terminal device, including a transmitter and a receiver.

The transmitter may be the transmission module according to the embodiments disclosed herein, and the receiver may be the receiving module according to the embodiments disclosed herein.

In one embodiment, the terminal device further includes a memory and a processor.

The memory may be the storage module according to the embodiments disclosed herein, and the processor may be the processing module according to the embodiments disclosed herein.

In one embodiment, this application provides a computer-readable storage medium. The computer-readable storage medium stores an instruction. When running on a computer, the instruction enables the computer to perform the method according to the foregoing embodiments.

According to still another embodiment of this application, a computer program product including an instruction is provided. When running on a computer, the computer program product enables the computer to perform the methods according to the foregoing embodiments.

As can be learned, in the foregoing embodiments, the terminal device transmits at least the first indication information to the network device on the pre-allocated uplink resource, where the first indication information is used to indicate the data volume of the to-be-transmitted data of the terminal device. When the terminal device supports both the 5G communications system and the LTE communications system, the to-be-transmitted data may be MBB service data and/or URLLC service data, and the pre-allocated uplink resource may be specifically a grant-free resource. The grant-free resource may be used to transmit the URLLC service data. When the to-be-transmitted data is MBB service data, the terminal device may also transmit the data volume of the MBB service data to the network device by using the grant-free resource, so that the network device allocates the uplink resource to the terminal device based on the data volume of the MBB service data. The terminal device transmits the MBB service data on the uplink resource, thereby implementing a mechanism for the terminal device to apply for the uplink resource or transmit the data by using the grant-free resource.

DESCRIPTION OF EMBODIMENTS

Figure 1:
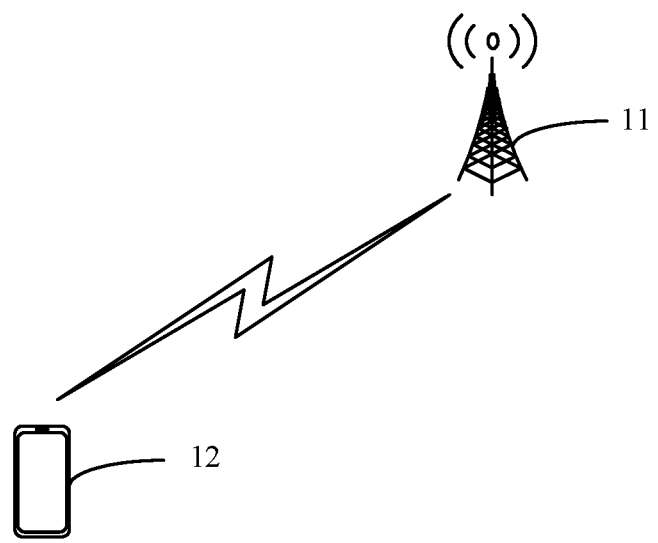
FIG. 1 is a schematic diagram of a communications system according to an embodiment of this application.

Embodiments of this application are applicable to various types of communications systems. FIG. 1 is a schematic diagram of a communications system according to an embodiment of this application. The communications system includes a network device 11 and a terminal device 12 (UE). The network device 11 may be a network-side device, for example, a wireless fidelity (Wi-Fi) access point AP, a next-generation communications base station such as a 5G gNB or a small cell or a micro base station, or a TRP, or may be a relay station, an access point, or an in-vehicle device. The terminal device 12 in the embodiments of this application may be an access terminal, a subscriber unit, a subscriber station, a mobile station, a mobile console, a remote station, a remote terminal, a mobile device, a user terminal, a terminal, a user agent or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal in a 5G network, and a station (STA) in next-generation WIFI.

In a long term evolution (LTE) system, the network device allocates a scheduling request (SR) resource to the terminal device, and the terminal device can apply to the network device for an uplink scheduling resource by transmitting an SR on the SR resource, and transmit conventional mobile broadband (MBB) service data on the uplink scheduling resource allocated by the network device to the terminal device.

In a 5G network, an ultra-reliable low latency communications (URLLC) service is introduced. The URLLC service may prefer and/or require a data transmission latency to be less than 0.5 ms and may prefer and/or require a data transmission success probability to be greater than or equal to 99.999%. Such requirements are much stricter than those imposed by existing LTE systems. To meet the requirements of the URLLC service, uplink data transmission of the URLLC service may be performed by using a grant-free resource.

The prior art has not provided a clear mechanism to resolve how the terminal device uses the grant-free resource and an SR resource to transmit the data or apply for the uplink scheduling resource when the terminal device supports both the 5G communications system and the LTE communications system.

A method for transmitting MBB service data in the LTE system and a method for transmitting URLLC service data in the 5G network are specifically described below.

Figure 2:
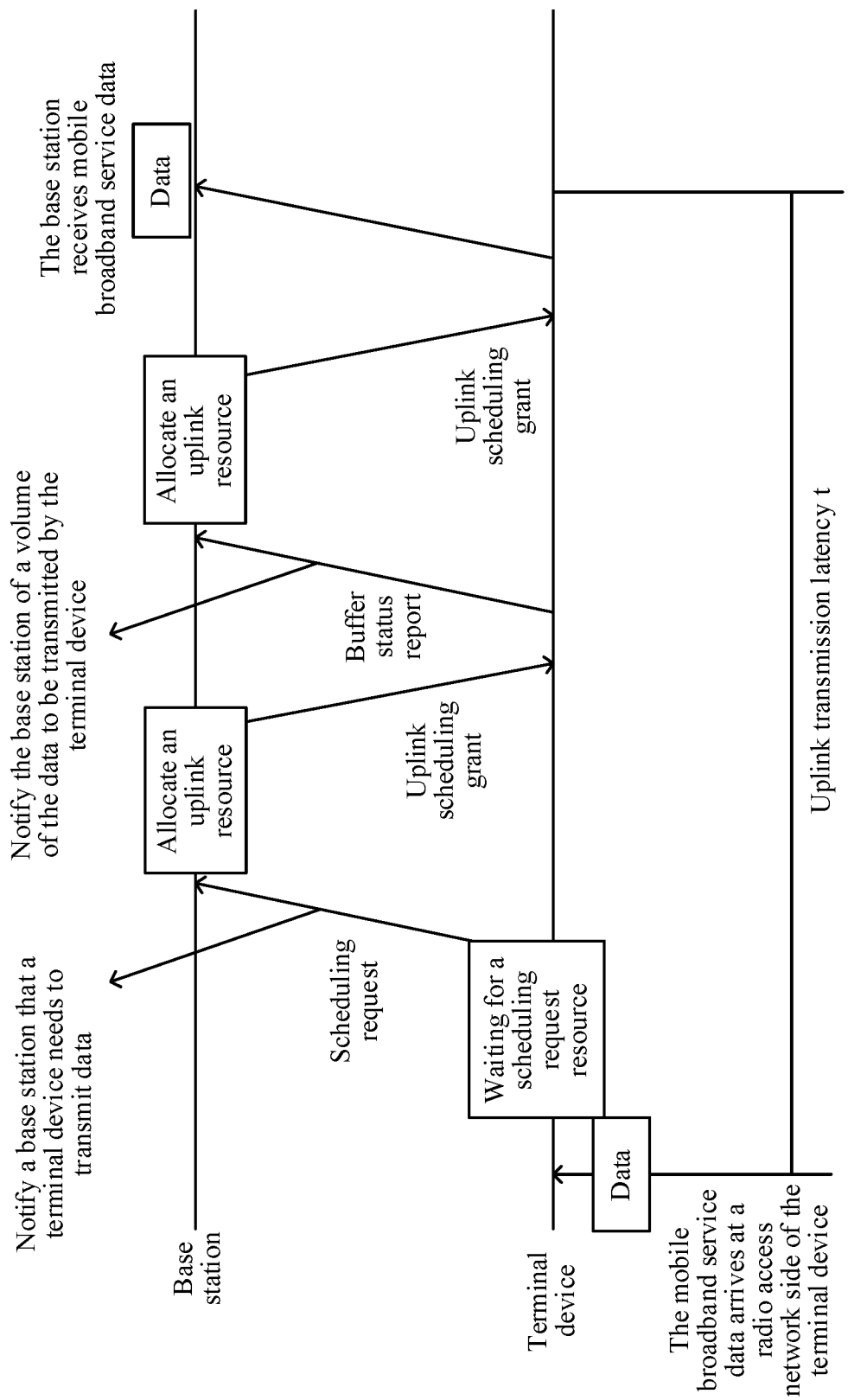
FIG. 2 is a schematic diagram of a method for transmitting MBB service data according to an embodiment of this application.

FIG. 2 is a schematic diagram of a method for transmitting MBB service data according to an embodiment of this application. As shown in FIG. 2, when MBB service data arrives at a radio access network (RAN) side of UE, the UE starts to wait for a SR resource. The SR resource is a dedicated resource allocated by a base station to each UE. An SR period is configured through an sr-ConfigIndex field of IE: SchedulingRequestConfig, and the base station may transmit the SR resource on a resource in a physical uplink control channel (PUCCH) format 1. After receiving the SR resource delivered by the base station, the UE transmits an SR on the SR resource, to notify the base station that the UE has data to transmit. After receiving the SR, the base station allocates a small part of uplink resources to the UE first. The small part of uplink resources is sufficient for the UE to transmit a buffer status report (BSR). Subsequently, the base station delivers an uplink scheduling grant UL grant to the UE. The UL grant is used to indicate a time, a carrier, and a modulation and coding scheme that may be used by the UE to upload the BSR. The UE transmits the BSR to the base station on an uplink resource indicated by the UL grant, to notify the base station of a volume of the data to be transmitted by the UE. After receiving the BSR, the base station allocates an uplink resource to the UE again, and delivers an UL grant to the UE. The UL grant is used to indicate a time, a carrier, and a modulation and coding scheme that may be used by the UE to upload the MBB service data. The UE transmits the MBB service data to the base station on the uplink resource indicated by this UL grant.

Figure 3:
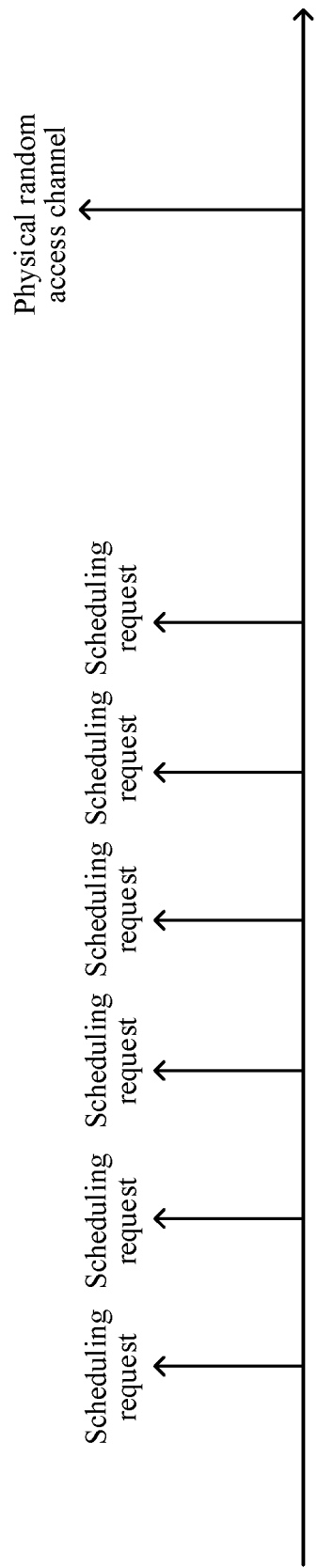
FIG. 3 is a schematic diagram of another method for transmitting MBB service data according to an embodiment of this application.

As shown in FIG. 3, if no UL grant delivered by the base station is received by the UE after the UE transmits the SR to the base station, the UE may continue to transmit the SR on a next SR occasion. If the UL grant delivered by the base station is still not received by the UE when a quantity of times of transmitting the SR by the UE reaches a particular quantity (such as six times, where the specific quantity is not limited in the embodiments of this application), the UE initiates a random access (RA) process on a next physical random access channel (PRACH) resource.

As can be learned from FIG. 2, a time from reception of the MBB service data by the UE to reception of the MBB service data by the base station is an uplink transmission latency t. For UE that has both a URLLC service and an MBB service, if uplink transmission is performed by applying for an uplink resource in only an SR+RA manner shown in FIG. 3, a latency requirement of the URLLC service may not be met.

In current discussions on 5G standards, a solution of performing uplink data transmission of the URLLC service by using a grant-free resource has been adopted. The grant-free transmission manner enables the UE to transmit the data in an arrive-and-go manner. The base station pre-allocates some grant-free resources to the UE first. Once URLLC service data arrives at the UE, the UE immediately transmits the data on a next grant-free resource without transmitting an SR to the base station and without requiring the base station to schedule an uplink resource and deliver a UL grant for the UE. This transmission manner drastically reduces the uplink transmission latency.

However, a plurality of UEs can share a same grant-free resource. If a plurality of UEs simultaneously transmit data on the same grant-free resource, a conflict occurs. In the event of a conflict, the uplink transmission latency increases.

Figure 4:
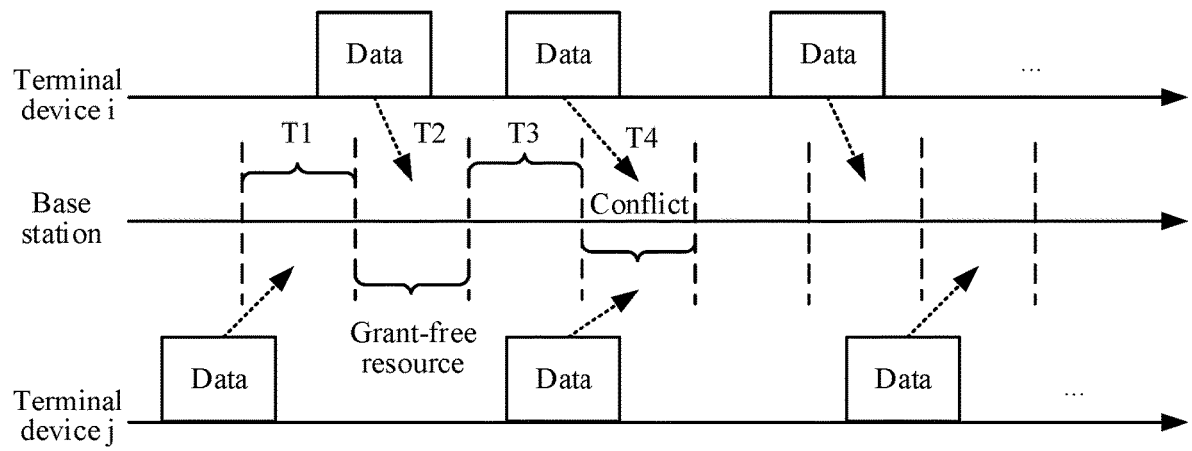
FIG. 4 is a schematic diagram of a method for transmitting URLLC service data according to an embodiment of this application.

FIG. 4 is a schematic diagram of a method for transmitting URLLC service data according to an embodiment of this application. As shown in FIG. 4, UEj and UEi share a same grant-free resource. At a time T1 and a time T2, the UEj and the UEi do not transmit data on the same grant-free resource. At a time T4, the UEj and the UEi transmit data on the same grant-free resource, thereby causing a conflict. For the UE that has both the URLLC service and the MBB service, if the URLLC service data and/or the MBB service data is transmitted by using only the grant-free resource shown in FIG. 4, the conflict on the grant-free resource may be severer, and the uplink transmission latency may be longer.

In summary, for the UE that has both the URLLC service and the MBB service, if an uplink resource is applied for and uplink transmission of the URLLC service data and/or the MBB service data is performed in only the SR+RA manner shown in FIG. 3, the latency requirement of the URLLC service may not be met. If the URLLC service data and/or the MBB service data is transmitted by using only the grant-free resource shown in FIG. 4, the conflict on the grant-free resource may be severer, and the uplink transmission latency may be longer. Therefore, it is necessary to use both the grant-free resource and the SR resource to transmit data or apply for the uplink scheduling resource. However, the prior art has not provided a clear mechanism to use both the grant-free resource and the SR resource to transmit data or apply for the uplink scheduling resource. To resolve this problem, embodiments of this application provide a resource scheduling method. Specifically, the following embodiments are provided. The following describes the embodiments with reference to specific scenarios.

Figure 5:
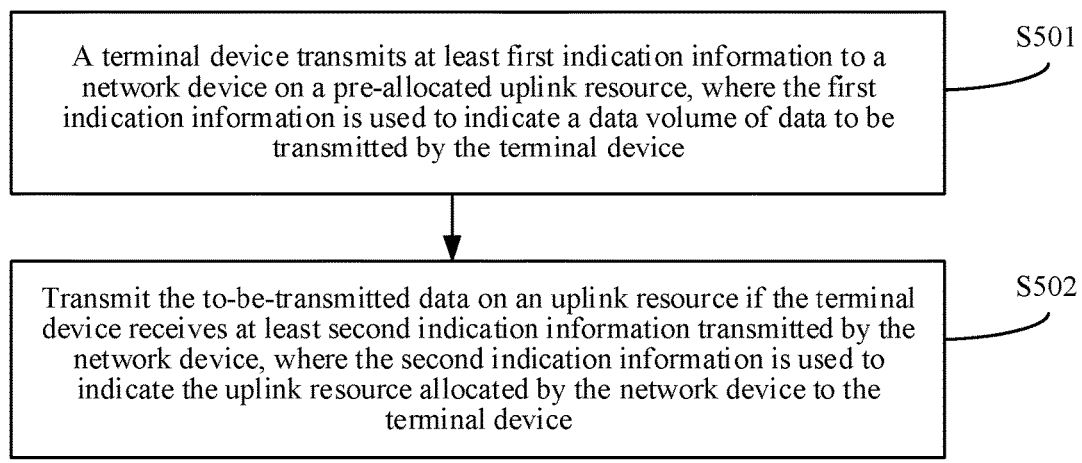
FIG. 5 is a schematic flowchart of a resource scheduling method according to an embodiment of this application.

FIG. 5 is a schematic flowchart of a resource scheduling method according to an embodiment of this application. The method described in this embodiment of this application is applicable to not only a 5G system. The method described in this embodiment of this application is applicable as long as an uplink resource should be allocated by one of two communication parties. The following describes the resource scheduling method by using a 5G system as an example. As shown in FIG. 5, the method specifically includes the following blocks.

Block S501: A terminal device transmits at least first indication information to a network device on a pre-allocated uplink resource, where the first indication information is used to indicate a data volume of to-be-transmitted data of the terminal device. In this embodiment of this application, for example, the terminal device is UE, and the network device is a base station. The pre-allocated uplink resource may be specifically a grant-free resource, that is, a grant-free resource, and the first indication information may be specifically a buffer status report (BSR). The BSR is used to indicate a data volume of to-be-transmitted data of the terminal device. Specifically, the to-be-transmitted data is located in a buffer of the terminal device. The buffer includes first service data and/or second service data. The first service data includes at least mobile broadband MBB service data, and the second service data includes at least ultra-reliable low latency communication URL LC service data.

Specifically, the UE transmits the BSR to the base station on the grant-free resource. To be specific, the grant-free resource can be used not only to transmit the URLLC service data, but also to transmit the BSR. The BSR can indicate the data volume of the MBB service data, or can indicate the data volume of the URLLC service data, or can indicate both the data volume of the MBB service data and the data volume of the URLLC service data, or can indicate a data volume of all data in the buffer of the terminal device.

In an embodiment of this application, an implementable manner for the terminal device to transmit at least the first indication information to the network device on the pre-allocated uplink resource is: if the buffer of the terminal device includes the first service data, and a pre-allocated uplink resource corresponding to the terminal device is used to transmit at least the first indication information, the terminal device transmits the first indication information to the network device on the pre-allocated uplink resource. Specifically, when the buffer of the UE includes the MBB service data, and the grant-free resource corresponding to the UE may be used to transmit at least the BSR, the UE transmits the BSR to the base station on the grant-free resource. The base station may preconfigure, or the UE may decide, or a communications protocol between the UE and the base station may stipulate whether the grant-free resource can be used for transmitting the BSR.

Block S502: Transmit the to-be-transmitted data on an uplink resource if the terminal device receives at least second indication information transmitted by the network device, where the second indication information is used to indicate the uplink resource allocated by the network device to the terminal device.

In this embodiment of this application, the second indication information may be specifically an uplink scheduling grant UL grant, and the uplink resource may be specifically an uplink scheduling resource. After receiving the BSR transmitted by the UE, the base station allocates an uplink scheduling resource to the UE based on the BSR, and transmits a UL grant to the UE. The UL grant is used to indicate the uplink scheduling resource allocated by the base station to the UE. If the BSR indicates the data volume of the MBB service data, the UE may transmit the MBB service data to the base station on the uplink scheduling resource allocated by the base station to the UE. If the BSR indicates the data volume of the URLLC service data, the UE may transmit the URLLC service data to the base station on the uplink scheduling resource allocated by the base station to the UE. If the BSR indicates both the data volume of the MBB service data and the data volume of the URLLC service data, the UE may transmit both the MBB service data and the URLLC service data to the base station on the uplink scheduling resource allocated by the base station to the UE.

In this embodiment of this application, the terminal device transmits at least the first indication information to the network device on the pre-allocated uplink resource, where the first indication information is used to indicate the data volume of the to-be-transmitted data of the terminal device. When the terminal device supports both the 5G communications system and the LTE communications system, the to-be-transmitted data may be MBB service data and/or URLLC service data, and the pre-allocated uplink resource may be specifically a grant-free resource. The grant-free resource may be used to transmit the URLLC service data. When the to-be-transmitted data is MBB service data, the terminal device may also transmit the data volume of the MBB service data to the network device by using the grant-free resource, so that the network device allocates the uplink resource to the terminal device based on the data volume of the MBB service data. The terminal device transmits the MBB service data on the uplink resource, thereby implementing a mechanism for the terminal device to apply for the uplink resource or transmit the data by using the grant-free resource.

In this embodiment of this application, the resource scheduling method may be used in the following possible cases. A possible case is that the UE has only MBB service data, another possible case is that the UE has both MBB service data and URLLC service data, and yet another possible case is that the UE has only URLLC service data. The following describes the foregoing possible cases separately with reference to specific scenarios.

A possible scenario is that the UE has only MBB service data. In this case, the first indication information is used to indicate the data volume of the first service data. That is, the BSR is used to indicate the data volume of the MBB service data. On the basis of the embodiment shown in FIG. 5, if the second indication information transmitted by the network device is not received by the terminal device before arrival of a next pre-allocated uplink resource of the pre-allocated uplink resource, the terminal device retransmits the first indication information on the next pre-allocated uplink resource. The terminal device initiates a random access process if a quantity of times of transmitting the first indication information by the terminal device reaches a preset quantity of times; or the terminal device initiates a random access process if the second indication information transmitted by the network device is not received when a quantity of times of transmitting the first indication information by the terminal device reaches a preset quantity of times. The following gives a detailed description with reference to FIG. 6 and FIG. 7.

Figure 6:
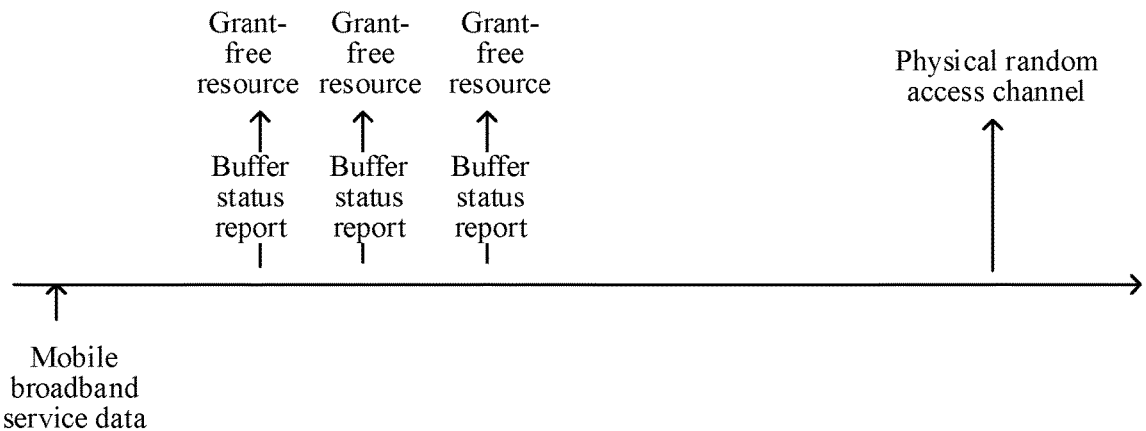
FIG. 6 is a schematic diagram of a scenario according to an embodiment of this application.

FIG. 6 is a schematic diagram of a scenario according to an embodiment of this application. As shown in FIG. 6, when the UE has only the MBB service data, the UE transmits the BSR by using the grant-free resource, and initiates an RA process after the BSR is transmitted for a particular quantity of times (such as three times, where the specific quantity of times is not limited in this embodiment of this application), or initiates an RA process if no UL grant delivered by the base station is received after the BSR is transmitted for a particular quantity of times.

Figure 7:
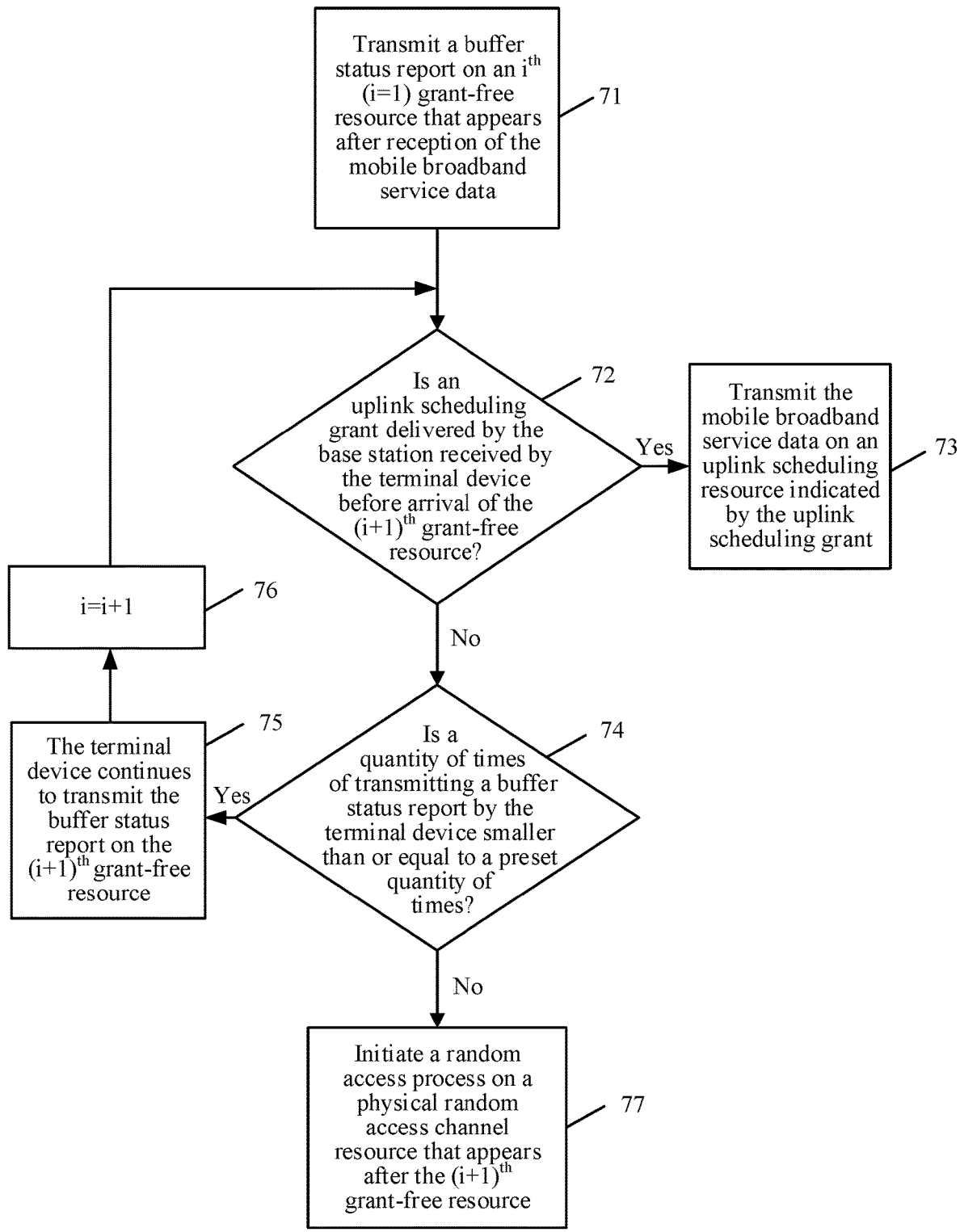
FIG. 7 is a schematic flowchart of another resource scheduling method according to an embodiment of this application.

In the scenario shown in FIG. 6, the UE has only MBB service data, and the base station preconfigures a grant-free resource for the UE. The grant-free resource may be shared by a plurality of UEs. When the MBB service data arrives at a UE side, the UE is triggered to generate a BSR of the MBB service data. As shown in FIG. 7, a subsequent process includes the following blocks.

Block 71: The UE transmits a BSR on an $i^{th}$ (i=1) grant-free resource that appears after reception of the MBB service data.

Block 72: The UE determines whether the UL grant delivered by the base station is received by the UE before arrival of the $(i+1)^{th}$ grant-free resource. If the UL grant is received, block 73 is performed; or if no UL grant is received, block 74 is performed.

Block 73: The UE transmits the MBB service data on an uplink scheduling resource indicated by the UL grant.

Block 74: The UE determines whether a quantity of times of transmitting the BSR is less than or equal to a preset quantity of times. If the quantity of times is less than or equal to the preset quantity of times, block 75 is performed; or if the quantity of times is larger than the preset quantity of times, block 77 is performed.

Block 75: The UE continues to transmit the BSR on the $(i+1)^{th}$ grant-free resource.

Block 76: When i=i+1, return to block 72.

Block 77: The UE initiates an RA process on a PRACH resource that appears after the $(i+1)^{th}$ grant-free resource.

In this embodiment of this application, the UE transmits the BSR of the MBB service data to the base station on the grant-free resource, thereby skipping the transmitting of the SR and an operation performed by the base station to deliver the BSR UL grant, reducing the uplink transmission latency and fully using the grant-free resource.

When the UE has only MBB service data, on the basis of the embodiment shown in FIG. 5, after the terminal device transmits at least the first indication information to the network device on the pre-allocated uplink resource, the method further includes: transmitting, by the terminal device, scheduling request information to the network device on a scheduling request resource allocated by the network device; retransmitting the first indication information on a next pre-allocated uplink resource if the second indication information transmitted by the network device is not received by the terminal device before arrival of the next pre-allocated uplink resource of the pre-allocated uplink resource; retransmitting the scheduling request information on a next scheduling request resource if the second indication information transmitted by the network device is not received by the terminal device before arrival of the next scheduling request resource of the scheduling request resource; initiating a random access process if a sum of a quantity of times of transmitting the first indication information and a quantity of times of transmitting the scheduling request information by the terminal device reaches a preset quantity of times; or initiating a random access process if the second indication information transmitted by the network device is not received when a sum of a quantity of times of transmitting the first indication information and a quantity of times of transmitting the scheduling request information by the terminal device reaches a preset quantity of times. The following gives a detailed description with reference to FIG. 8 and FIG. 9.

Figure 8:
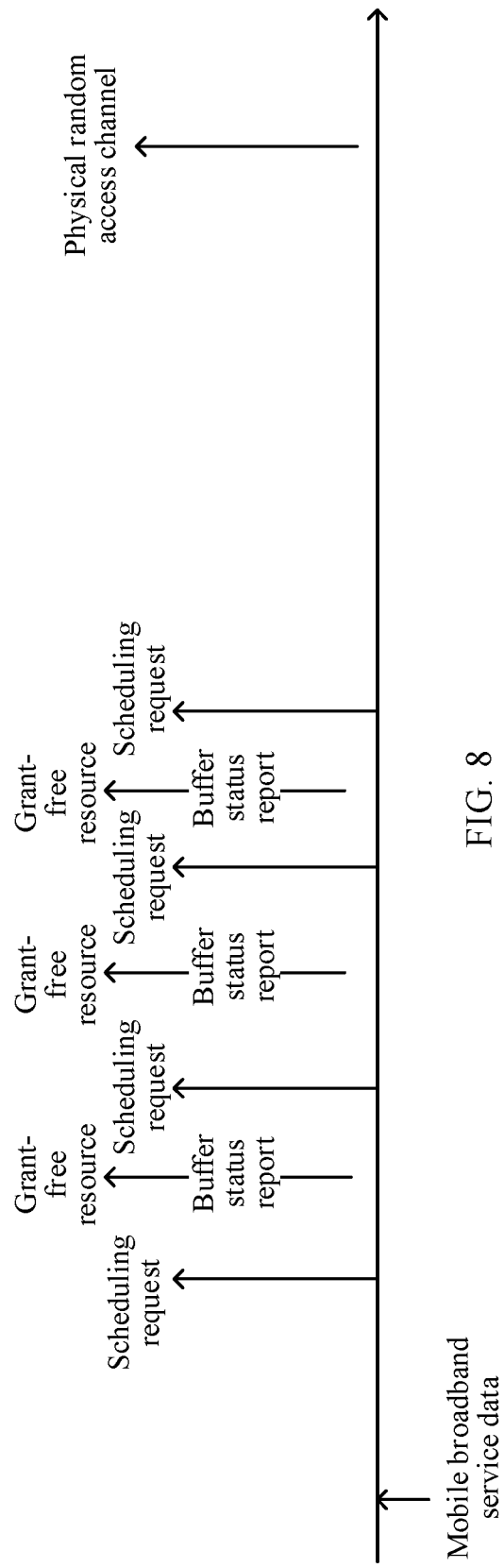
FIG. 8 is a schematic diagram of another scenario according to an embodiment of this application.

FIG. 8 is a schematic diagram of another scenario according to an embodiment of this application. As shown in FIG. 8, when the UE has only MBB service data, the UE transmits the SR on the SR resource, transmits the BSR on the grant-free resource, and counting is performed for both the SR and the BSR. The UE initiates an RA process when the quantity of times of transmission reaches a particular value, or initiates an RA process if no UL grant delivered by the base station is received after the quantity of times of transmission reaches a particular value.

Figure 9:
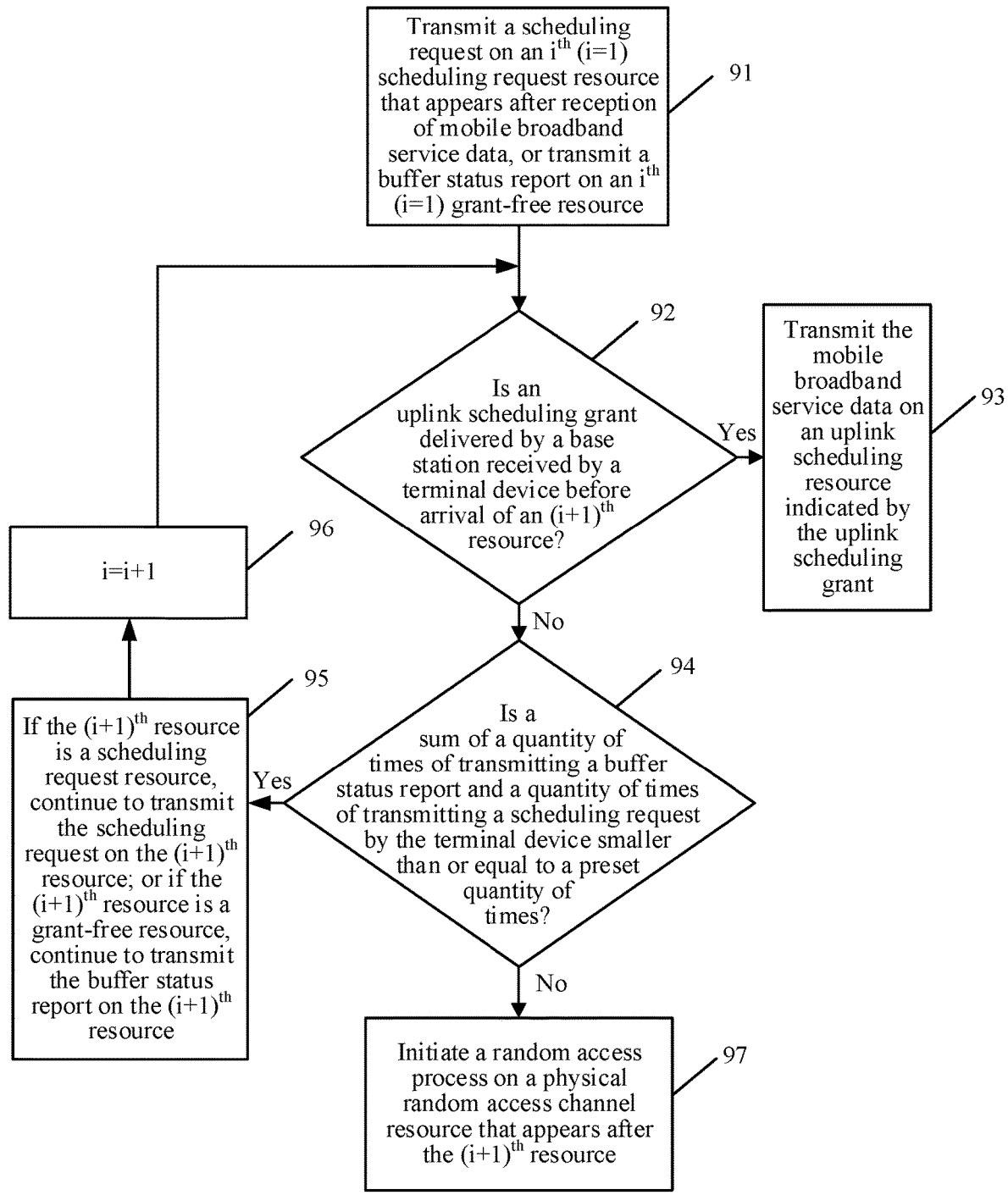
FIG. 9 is a schematic flowchart of still another resource scheduling method according to an embodiment of this application.

In the scenario shown in FIG. 8, the UE has only MBB service data, and the base station preconfigures a grant-free resource for the UE. The grant-free resource may be shared by a plurality of UEs. When the MBB service data arrives at a UE side, the UE is triggered to generate a BSR of the MBB service data. As shown in FIG. 9, a subsequent process includes the following blocks.

Block 91: If the $i^{th}$ (i=1) resource that appears after the UE receives the MBB service data is an SR resource, the UE transmits an SR on the SR resource; if the $i^{th}$ (i=1) resource that appears after the UE receives the MBB service data is a grant-free resource, the UE transmits a BSR on the grant-free resource.

Block 92: The UE determines whether the UL grant delivered by the base station is received by the UE before arrival of the $(i+1)^{th}$ resource (either an SR resource or a grant-free resource). If the UL grant is received, block 93 is performed; or if no UL grant is received, block 94 is performed.

Block 93: The UE transmits the MBB service data on an uplink scheduling resource indicated by the UL grant.

Block 94: The UE determines whether a sum of a quantity of times of transmitting the BSR and a quantity of times of transmitting the SR is less than or equal to a preset quantity of times. If the sum is less than or equal to the preset quantity of times, block 95 is performed; or if the sum is larger than the preset quantity of times, block 97 is performed.

Block 95: If the $(i+1)^{th}$ resource is an SR resource, continue to transmit the SR on the $(i+1)^{th}$ resource; if the $(i+1)^{th}$ resource is a grant-free resource, continue to transmit the BSR on the $(i+1)^{th}$ resource.

Block 96: When i=i+1, return to block 92.

Block 97: The UE initiates an RA process on a PRACH resource that appears after the $(i+1)^{th}$ resource.

In this embodiment of this application, the UE transmits the SR of the MBB service data on the SR resource, and transmits the BSR on the grant-free resource. Therefore, the UE can apply for an uplink transmission resource on all available resources, thereby reducing the uplink transmission latency and fully using the grant-free resource.

When the UE has only MBB service data, on the basis of the embodiment shown in FIG. 5, if the second indication information transmitted by the network device is not received by the terminal device before arrival of a next pre-allocated uplink resource of the pre-allocated uplink resource, the terminal device retransmits the first indication information on the next pre-allocated uplink resource. If a quantity of times of transmitting the first indication information by the terminal device reaches a preset quantity of times, the terminal device transmits scheduling request information to the network device on a scheduling request resource allocated by the network device; or if the second indication information transmitted by the network device is not received by the terminal device when a quantity of times of transmitting the first indication information by the terminal device reaches a preset quantity of times, the terminal device transmits scheduling request information to the network device on a scheduling request resource allocated by the network device. After the transmitting the scheduling request information to the network device on a scheduling request resource allocated by the network device, the method further includes: retransmitting the scheduling request information on a next scheduling request resource if the second indication information transmitted by the network device is not received by the terminal device before arrival of the next scheduling request resource of the scheduling request resource; initiating a random access process if a quantity of times of transmitting the scheduling request information by the terminal device reaches a preset quantity of times; or initiating a random access process if the second indication information transmitted by the network device is not received when a quantity of times of transmitting the scheduling request information by the terminal device reaches a preset quantity of times. The following gives a detailed description with reference to FIG. 10, FIG. 11A, and FIG. 11B.

Figure 10:
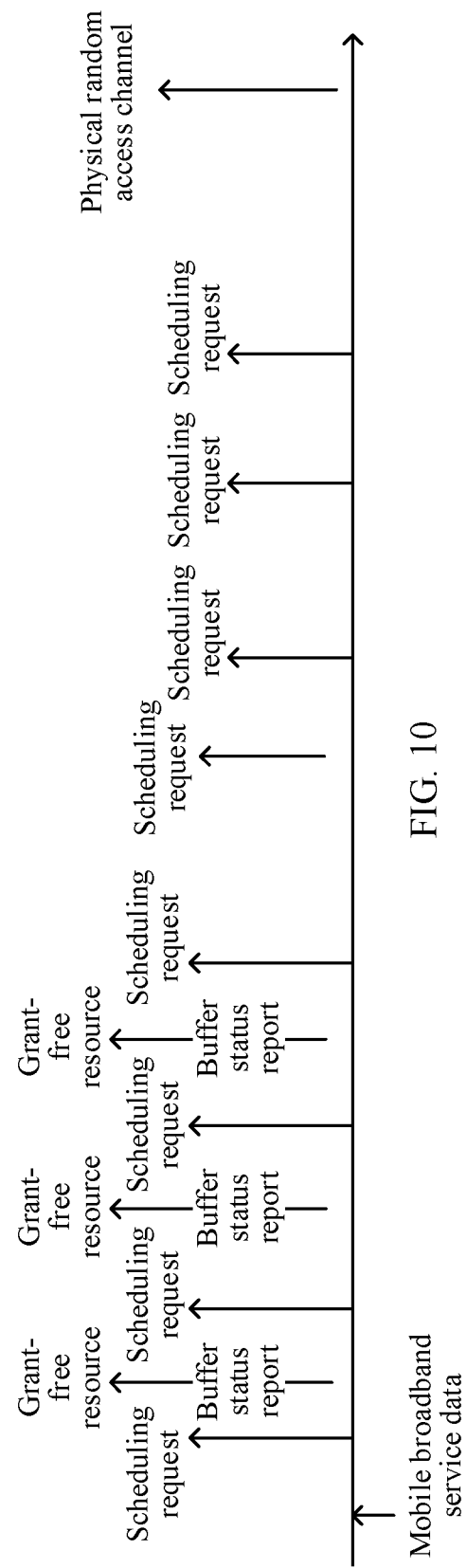
FIG. 10 is a schematic diagram of still another scenario according to an embodiment of this application.

FIG. 10 is a schematic diagram of still another scenario according to an embodiment of this application. As shown in FIG. 10, when the UE has only MBB service data, the UE transmits the BSR on the grant-free resource. After the BSR is transmitted for a particular quantity of times, if the UE receives no UL grant delivered by the base station, the UE transmits the SR on a next SR resource, and initiates an RA process after the SR is transmitted for a particular quantity of times, or initiates an RA process if no UL grant delivered by the base station is received after the SR is transmitted for a particular quantity of times.

Figure 11A:
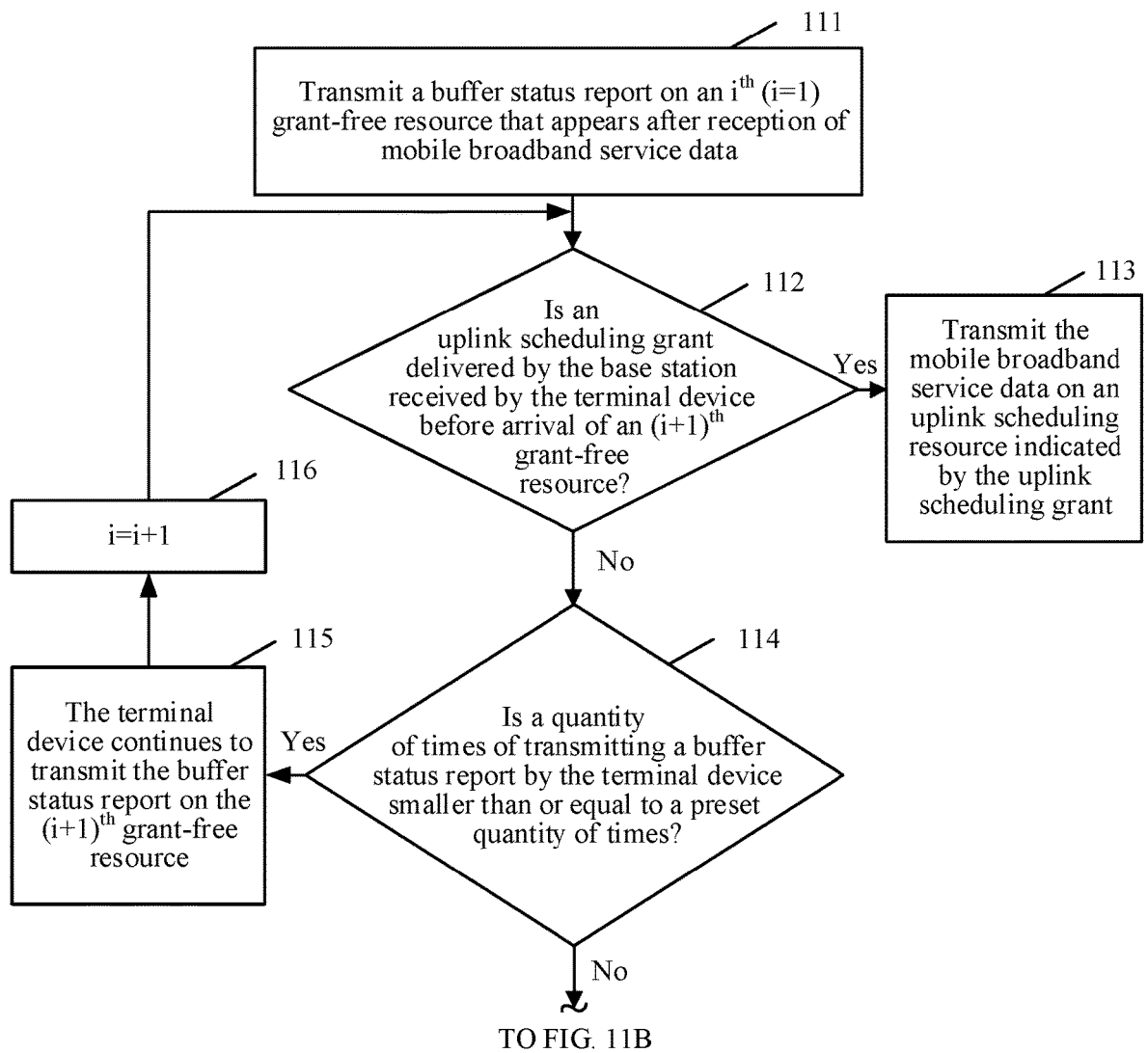
FIG. 11A and FIG. 11B are a schematic flowchart of yet another resource scheduling method according to an embodiment of this application.
Figure 11B:
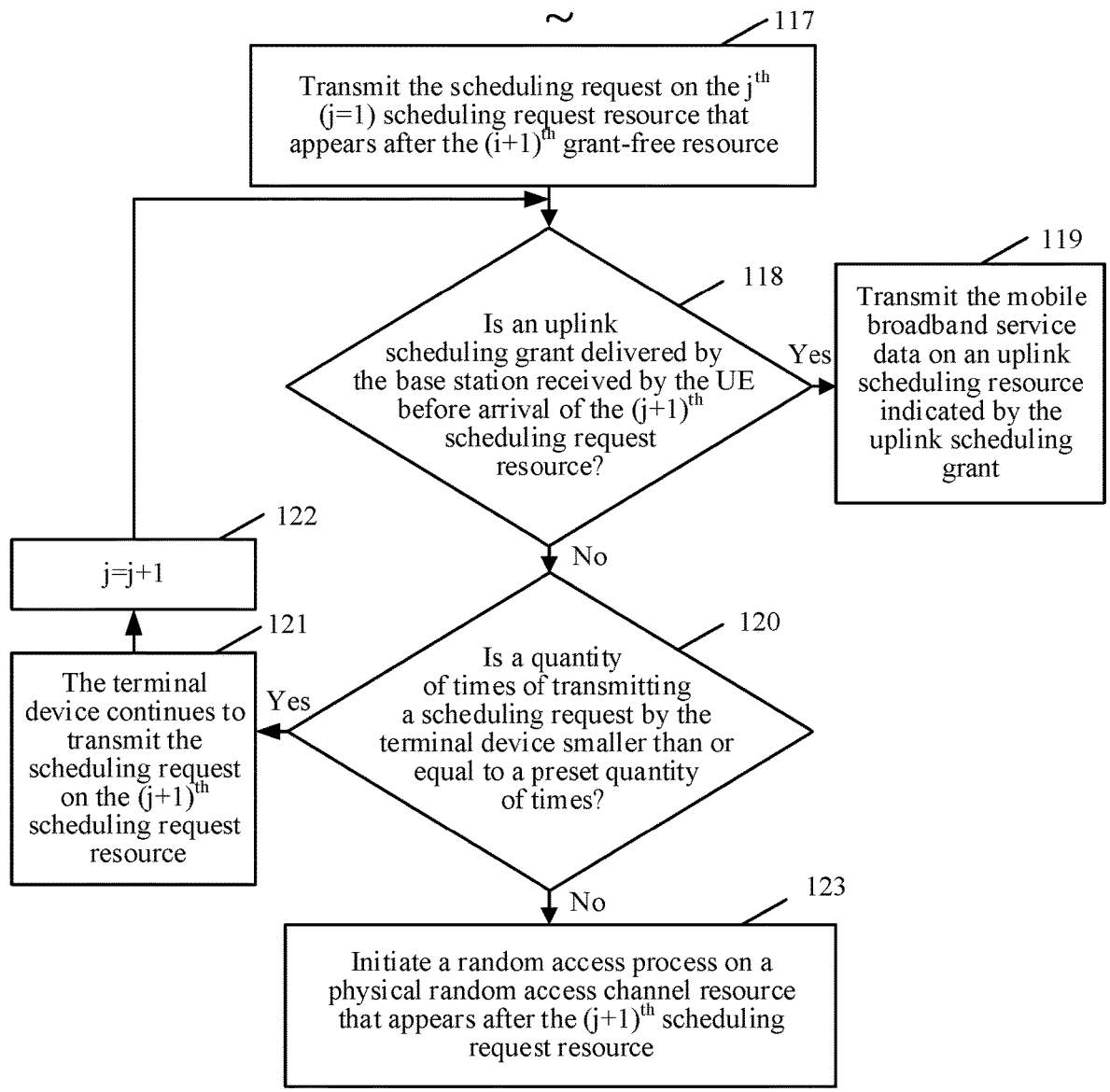

In the scenario shown in FIG. 10, the UE has only MBB service data, and the base station preconfigures a grant-free resource for the UE. The grant-free resource may be shared by a plurality of UEs. When the MBB service data arrives at a UE side, the UE is triggered to generate a BSR of the MBB service data. As shown in FIG. 11A and FIG. 11B, a subsequent process includes the following blocks.

Block 111: The UE transmits a BSR on the $i^{th}$ (i=1) grant-free resource that appears after reception of the MBB service data.

Block 112: The UE determines whether the UL grant delivered by the base station is received by the UE before arrival of the $(i+1)^{th}$ grant-free resource. If the UL grant is received, block 113 is performed; or if no UL grant is received, block 114 is performed.

Block 113: The UE transmits the MBB service data on an uplink scheduling resource indicated by the UL grant.

Block 114: The UE determines whether a quantity of times of transmitting the BSR is less than or equal to a preset quantity of times. If the quantity of times is less than or equal to the preset quantity of times, block 115 is performed; or if the quantity of times is larger than the preset quantity of times, block 117 is performed.

Block 115: The UE continues to transmit the BSR on the $(i+1)^{th}$ grant-free resource.

Block 116: When i=i+1, return to block 112.

Block 117: The UE transmits the SR on the $i^{th}$ (j=1) SR resource that appears after the grant-free resource.

Block 118: The UE determines whether the UL grant delivered by the base station is received by the UE before arrival of the $(j+1)^{th}$ SR resource. If the UL grant is received, block 119 is performed; or if no UL grant is received, block 120 is performed.

Block 119: The UE transmits the MBB service data on an uplink scheduling resource indicated by the UL grant.

Block 120: The UE determines whether a quantity of times of transmitting the SR is less than or equal to a preset quantity of times. If the quantity of times is less than or equal to the preset quantity of times, block 121 is performed; or if the quantity of times is larger than the preset quantity of times, block 123 is performed.

Block 121: The UE continues to transmit the SR on the $(j+1)^{th}$ SR resource.

Block 122: When j=j+1, return to block 118.

Block 123: The UE initiates an RA process on a PRACH resource that appears after the $(j+1)^{th}$ SR resource.

In this embodiment of this application, the UE transmits the BSR of the MBB service data on the grant-free resource first, and if the UE cannot receive the UL grant due to a conflict on the grant-free resource, the UE then retransmits the SR on the SR resource, thereby reducing the uplink transmission latency and fully using the grant-free resource.

When the UE has only MBB service data, on the basis of the embodiment shown in FIG. 5, the transmitting, by the terminal device, at least the first indication information to the network device on the pre-allocated uplink resource includes: transmitting, by the terminal device, the first indication information and a part of the first service data to the network device on the pre-allocated uplink resource. The transmitting the to-be-transmitted data on an uplink resource if the terminal device receives at least second indication information transmitted by the network device includes: transmitting a remaining part of the first service data on the uplink resource if the terminal device receives an acknowledgment feedback of the network device on the part of the first service data before receiving the second indication information transmitted by the network device; transmitting the first service data on the uplink resource if the terminal device receives no acknowledgment feedback of the network device on the part of the first service data before receiving the second indication information transmitted by the network device. The first indication information and the part of the first service data are retransmitted on a next pre-allocated uplink resource if the second indication information transmitted by the network device is not received by the terminal device before arrival of the next pre-allocated uplink resource of the pre-allocated uplink resource. A random access process is initiated if a quantity of times of transmitting the first indication information and the part of the first service data by the terminal device reaches a preset quantity of times; or a random access process is initiated if the second indication information transmitted by the network device is not received when a quantity of times of transmitting the first indication information and the part of the first service data by the terminal device reaches a preset quantity of times. The following gives a detailed description with reference to FIG. 12 and FIG. 13.

Figure 12:
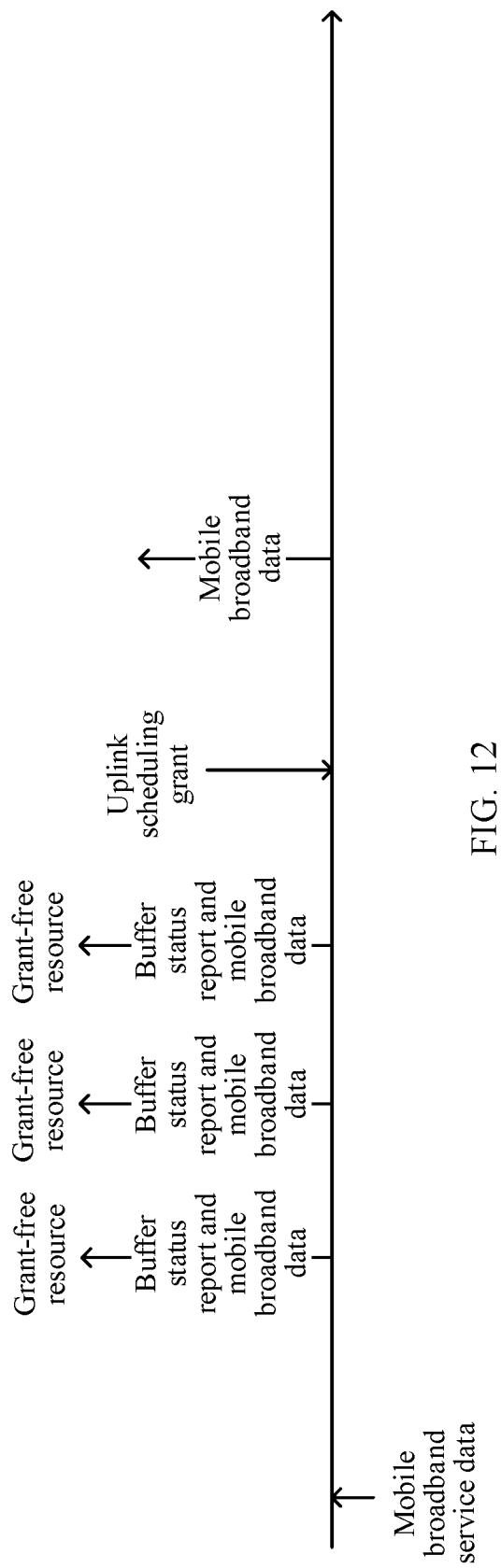
FIG. 12 is a schematic diagram of yet another scenario according to an embodiment of this application.

FIG. 12 is a schematic diagram of yet another scenario according to an embodiment of this application. As shown in FIG. 12, when the UE has only MBB service data, the UE transmits the BSR and a small part of MBB service data on the grant-free resource, and initiates an RA process after a quantity of times of transmission reaches a particular quantity, or initiates an RA process if no UL grant delivered by the base station is received after a quantity of times of transmission reaches a particular quantity.

Figure 13:
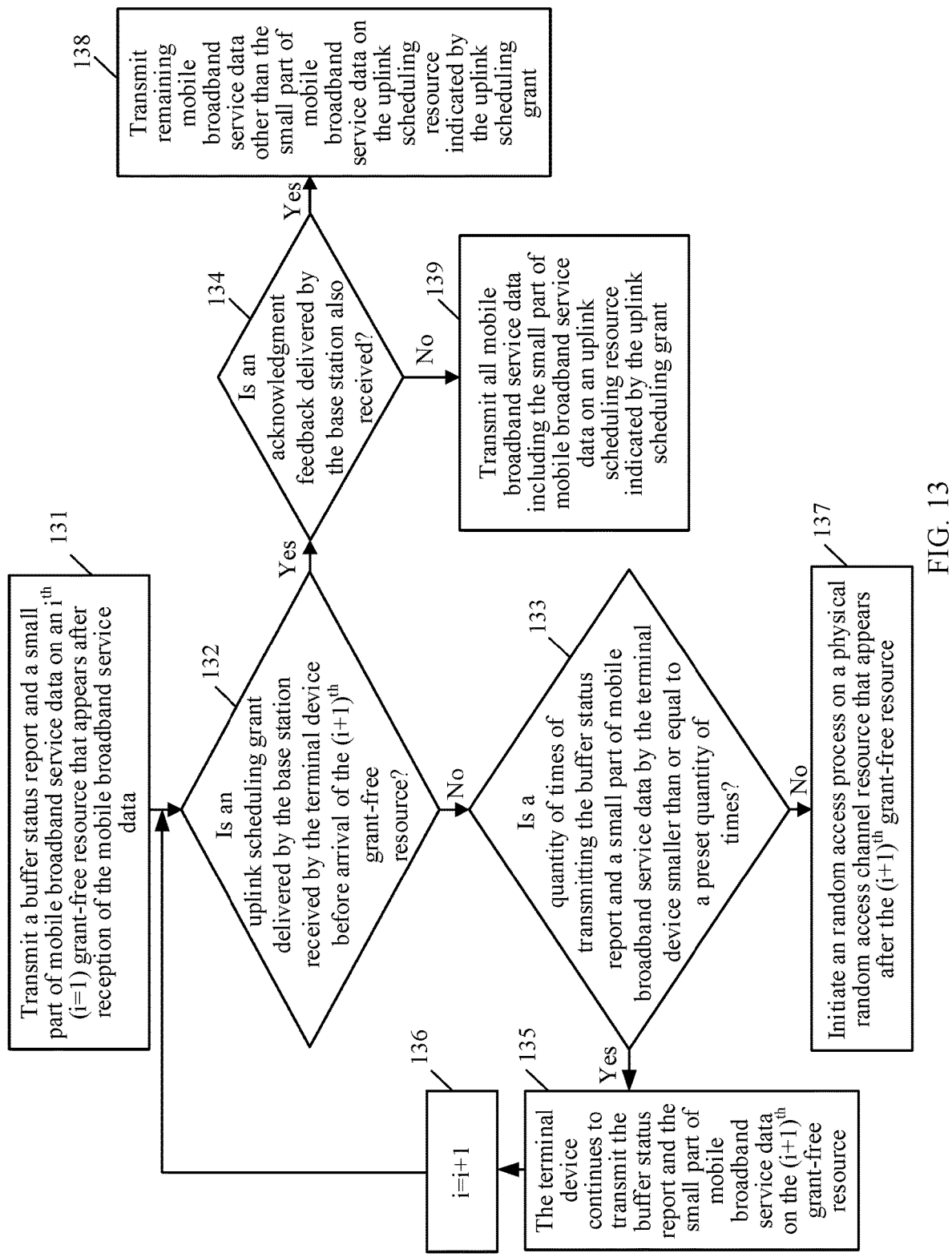
FIG. 13 is a schematic flowchart of yet another resource scheduling method according to an embodiment of this application.

In the scenario shown in FIG. 12, the UE has only MBB service data, and the base station preconfigures a grant-free resource for the UE. The grant-free resource may be shared by a plurality of UEs. When the MBB service data arrives at a UE side, the UE is triggered to generate a BSR of the MBB service data. As shown in FIG. 13, a subsequent process includes the following blocks.

Block 131: The UE transmits a BSR and a small part of MBB service data on the $i^{th}$ (i=1) grant-free resource that appears after reception of the MBB service data.

Block 132: The UE determines whether the UL grant delivered by the base station is received by the UE before arrival of the $(i+1)^{th}$ grant-free resource. If the UL grant is received, block 134 is performed; or if no UL grant is received, block 133 is performed.

Block 133: The UE determines whether a quantity of times of transmitting the BSR and the small part of MBB service data is less than or equal to a preset quantity of times. If the quantity of times is less than or equal to the preset quantity of times, block 135 is performed; or if the quantity of times is larger than the preset quantity of times, block 137 is performed.

Block 134: The UE determines whether an ACK feedback delivered by the base station is received in addition to the UL grant delivered by the base station. If the ACK feedback is received, block 138 is performed; or if no ACK feedback is received, block 139 is performed.

Block 135: The UE continues to transmit the BSR and the small part of MBB service data on the $(i+1)^{th}$ grant-free resource.

Block 136: When i=i+1, return to block 132.

Block 137: Initiate an RA process on a PRACH resource that appears after the $(i+1)^{th}$ grant-free resource.

Block 138: Transmit remaining MBB service data other than the small part of MBB service data on an uplink scheduling resource indicated by the UL grant.

If the UE receives an ACK feedback in addition to the UL grant, the UE does not transmit the small part of MBB service data on the uplink scheduling resource indicated by the UL grant, where the small part of MBB service data is previously transmitted on the grant-free resource.

Block 139: Transmit all MBB service data including the small part of MBB service data on the uplink scheduling resource indicated by the UL grant.

If the UE receives only the UL grant but no ACK feedback, the UE also transmits the small part of MBB service data on the uplink scheduling resource indicated by the UL grant, where the small part of MBB service data is previously transmitted on the grant-free resource.

In this embodiment of this application, the UE transmits the BSR of the MBB service data and a small part of MBB service data on the grant-free resource, thereby skipping performing the transmitting of the SR and an operation performed by the base station to deliver the BSR UL grant, reducing the uplink transmission latency and fully using the grant-free resource.

Figure 14:
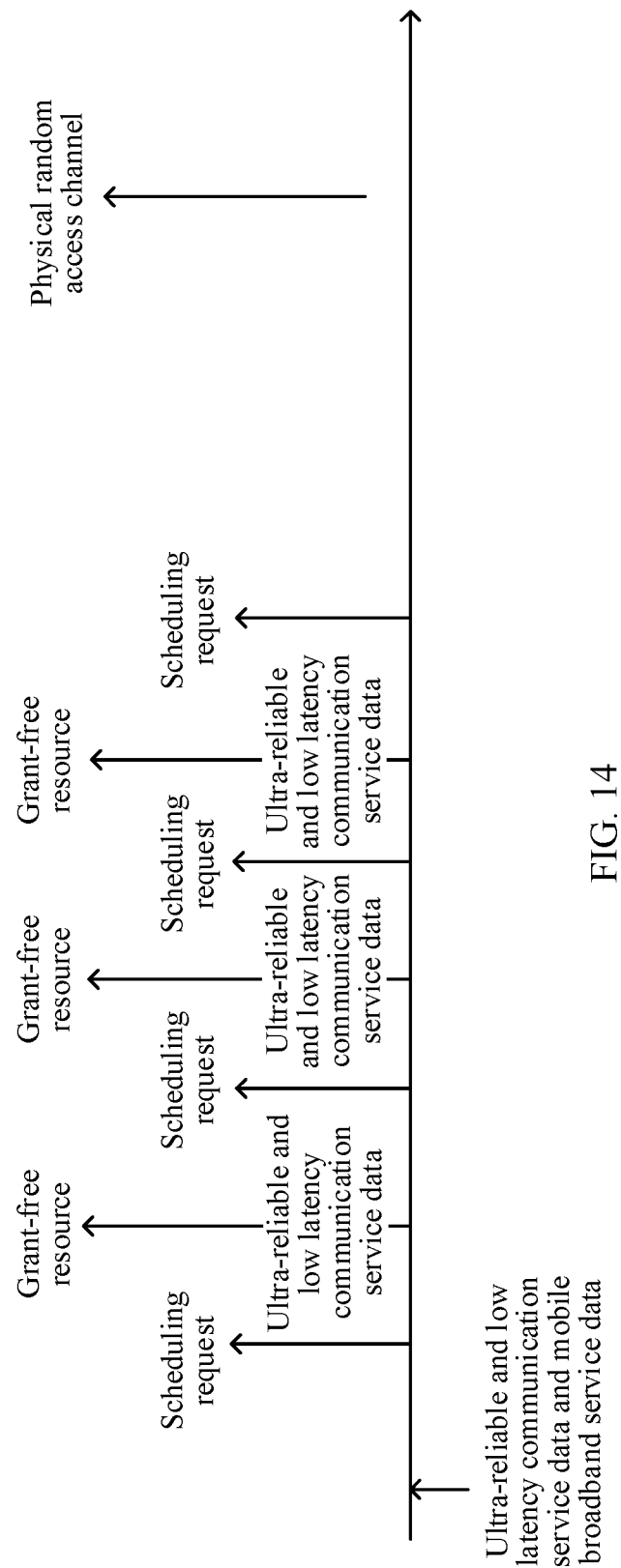
FIG. 14 is a schematic diagram of yet another scenario according to an embodiment of this application.

Another possible scenario is that the UE has both MBB service data and URLLC service data. FIG. 14 is a schematic diagram of yet another scenario according to an embodiment of this application. As shown in FIG. 14, when the UE has both the URLLC service data and the MBB service data, the UE transmits only the URLLC service data on the grant-free resource. The URLLC service data does not trigger the SR, but the MBB service data triggers the SR. Counting is performed for only the SR, and an RA process is initiated if no UL grant is received after the SR is transmitted for a particular quantity of times.

In the scenario shown in FIG. 14, the UE has both URLLC service data and MBB service data, and the base station preconfigures a grant-free resource for the UE. The grant-free resource may be shared by a plurality of UEs. Transmitting the URLLC service data and transmitting the MBB service data by the UE are two relatively independent processes. The specific processes are as follows.

When the URLLC service data arrives at the UE side, the UE transmits the URLLC service data on the grant-free resource that appears after reception of the URLLC service data. Specifically, the UE compares a size of a current grant-free resource and a size of the URLLC service data. If the size of the URLLC service data is larger than the size of the current grant-free resource, the UE transmits a part of the URLLC service data on the current grant-free resource, and transmits remaining URLLC service data on a next grant-free resource. If the size of the URLLC service data is less than or equal to the size of the current grant-free resource, the UE transmits all URLLC service data on the current grant-free resource.

Figure 15:
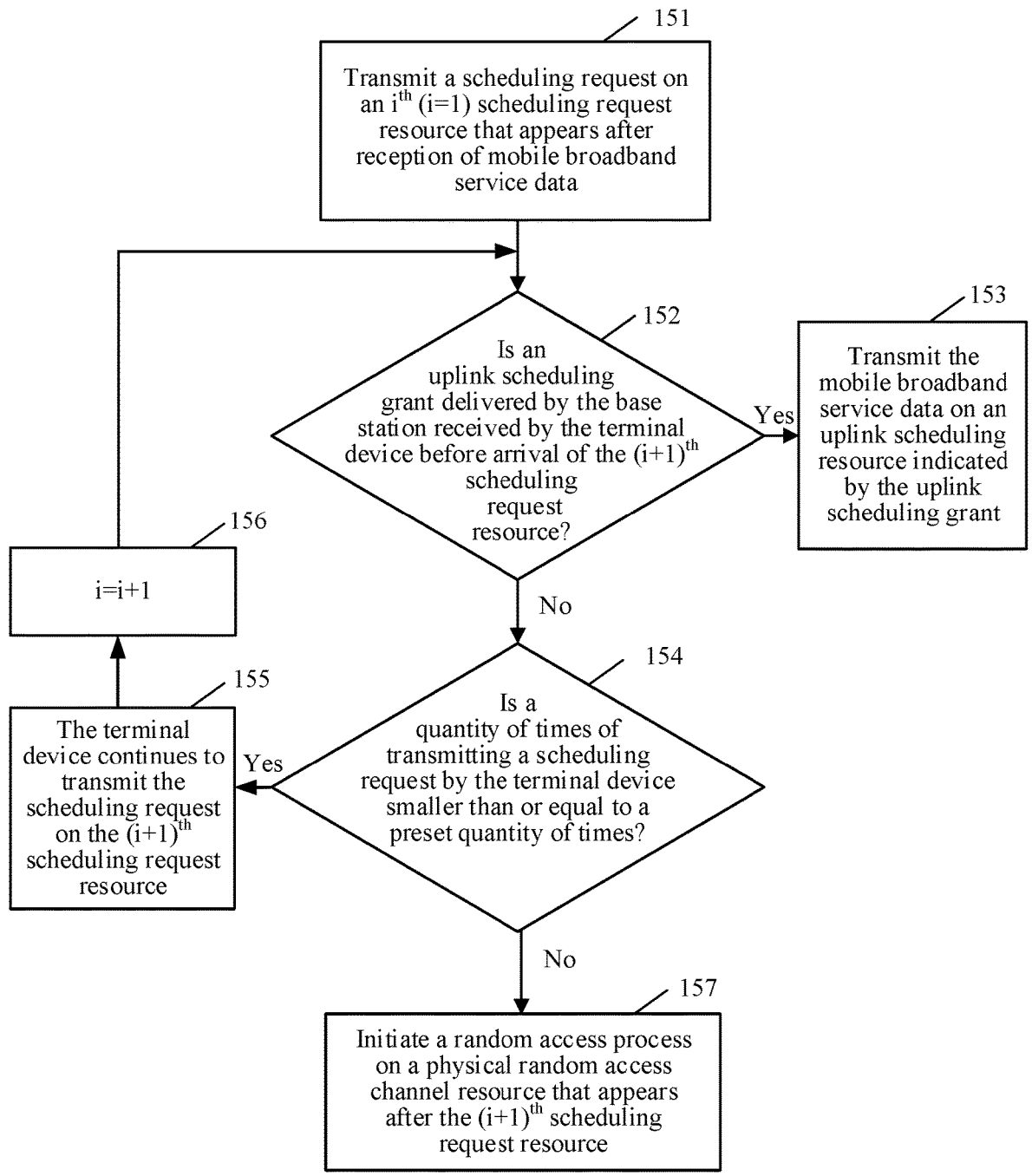
FIG. 15 is a schematic flowchart of yet another resource scheduling method according to an embodiment of this application.

When the MBB service data arrives at the UE side, the UE is triggered to generate a BSR and an SR of the MBB service data. As shown in FIG. 15, a subsequent process includes the following blocks.

Block 151: The UE transmits the SR on the $i^{th}$ (i=1) SR resource that appears after reception of the MBB service data.

Block 152: The UE determines whether the UL grant delivered by the base station is received by the UE before arrival of the $(i+1)^{th}$ SR resource. If the UL grant is received, block 153 is performed; or if no UL grant is received, block 154 is performed.

Block 153: The UE transmits the MBB service data on an uplink scheduling resource indicated by the UL grant.

Block 154: The UE determines whether a quantity of times of transmitting the SR is less than or equal to a preset quantity of times. If the quantity of times is less than or equal to the preset quantity of times, block 155 is performed; or if the quantity of times is larger than the preset quantity of times, block 157 is performed.

Block 155: The UE continues to transmit the SR on the $(i+1)^{th}$ SR resource.

Block 156: When i=i+1, return to block 152.

Block 157: The UE initiates an RA process on a PRACH resource that appears after the $(i+1)^{th}$ SR resource.

In this embodiment of this application, the UE transmits the URLLC service data on the grant-free resource, and transmits the MBB service data to the base station in an SR+RA manner, so that the data of the two services is transmitted on different resources separately. This reduces the uplink transmission latency and fully uses the grant-free resource.

When the UE has both MBB service data and URLLC service data, on the basis of the embodiment shown in FIG. 5, the transmitting, by the terminal device, at least the first indication information to the network device on the pre-allocated uplink resource includes: transmitting, by the terminal device, second service data and the first indication information to the network device on the pre-allocated uplink resource, where a priority of the second service data is higher than a priority of the first service data. After the transmitting, by the terminal device, second service data and the first indication information to the network device on the pre-allocated uplink resource, the method further includes: transmitting, by the terminal device if the second indication information transmitted by the network device is not received by the terminal device in a preset time period, scheduling request information to the network device on a scheduling request resource allocated by the network device; and determining, by the terminal device if the terminal device receives a next pre-allocated uplink resource of the pre-allocated uplink resource in a preset time period, whether to retransmit the second service data and the first indication information on the next pre-allocated uplink resource. The determining, by the terminal device, whether to retransmit the second service data and the first indication information on the next pre-allocated uplink resource includes: determining, by the terminal device, based on a size of the second service data and the first indication information as well as a latency budget of the second service data, whether to retransmit the second service data and the first indication information on the next pre-allocated uplink resource. The determining, by the terminal device, based on a size of the second service data and the first indication information as well as a latency budget of the second service data, whether to retransmit the second service data and the first indication information on the next pre-allocated uplink resource includes: determining to retransmit the second service data and the first indication information on the next pre-allocated uplink resource if the size of the second service data and the first indication information is less than or equal to a size of the next pre-allocated uplink resource; determining to transmit a part of the second service data and the first indication information on the next pre-allocated uplink resource if the size of the second service data and the first indication information is larger than a size of the next pre-allocated uplink resource and a latency budget of the second service data is greater than a preset latency; determining to transmit the second service data on the next pre-allocated uplink resource if the size of the second service data and the first indication information is larger than a size of the next pre-allocated uplink resource and a latency budget of the second service data is less than a preset latency.

The transmitting the to-be-transmitted data on an uplink resource if the terminal device receives at least second indication information transmitted by the network device includes: transmitting the second service data on an uplink resource if the terminal device receives the second indication information transmitted by the network device and receives the second service data before arrival of the uplink resource indicated by the second indication information; transmitting the first service data on an uplink resource if the terminal device receives the second indication information transmitted by the network device and receives no second service data before arrival of the uplink resource indicated by the second indication information.

In addition, a random access process is initiated if a sum of a quantity of times of transmitting the first indication information and a quantity of times of transmitting the scheduling request information by the terminal device reaches a preset quantity of times; or a random access process is initiated if the second indication information transmitted by the network device is not received when a sum of a quantity of times of transmitting the first indication information and a quantity of times of transmitting the scheduling request information by the terminal device reaches a preset quantity of times. The following gives a detailed description with reference to FIG. 16, FIG. 17A, and FIG. 17B.

Figure 16:
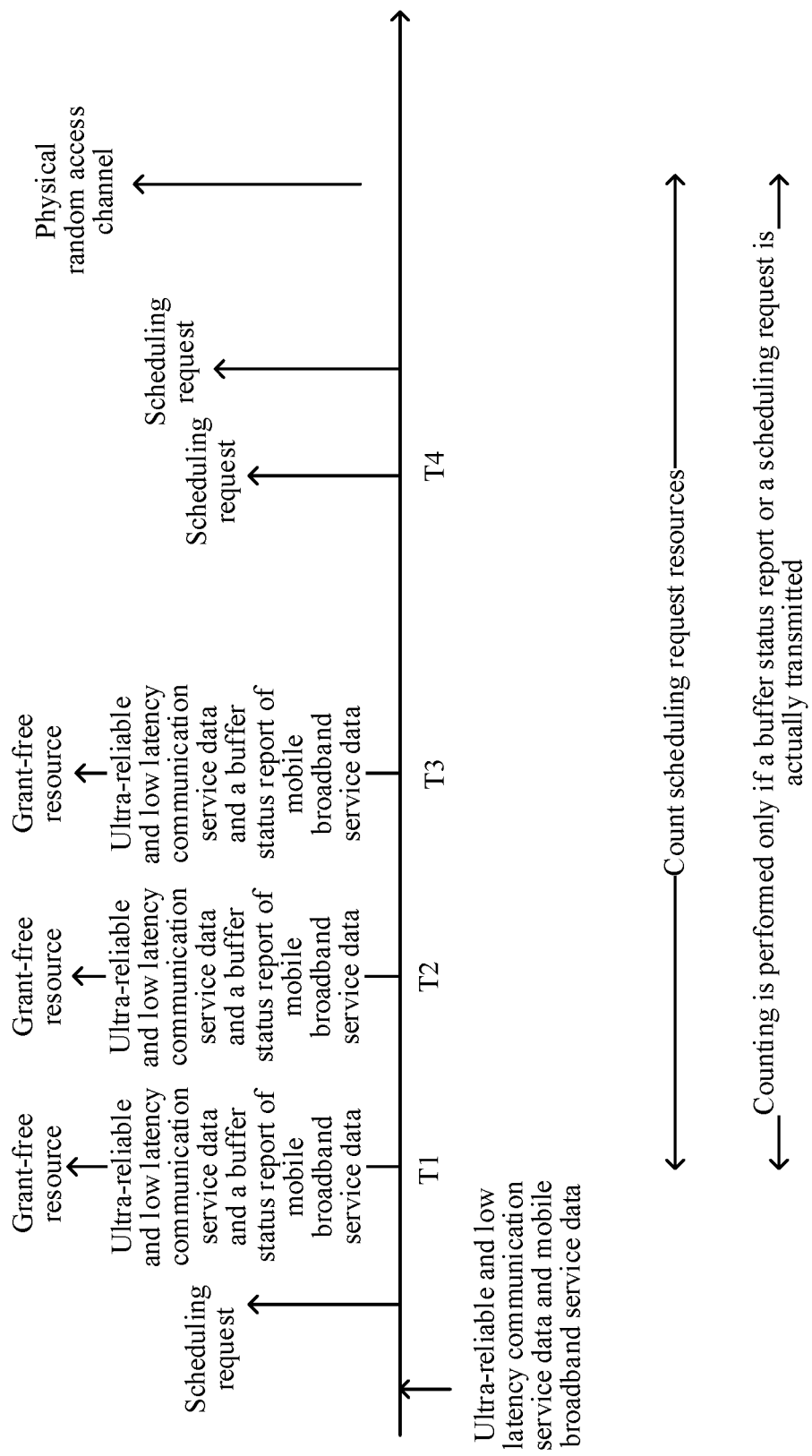
FIG. 16 is a schematic diagram of yet another scenario according to an embodiment of this application.

FIG. 16 is a schematic diagram of yet another scenario according to an embodiment of this application. As shown in FIG. 16, when the UE has both the URLLC service data and the MBB service data, the UE transmits not only the URLLC service data but also the BSR of the MBB service data on the grant-free resource, without transmitting the SR, but the SR remains in a triggered state. After using the grant-free resource to carry the BSR of the MBB service data, an SR timer is started. For example, the SR timer is started at time T1. If the UE uses the grant-free resource to carry the BSR of the MBB service data again, the SR timer should be reset. For example, the SR timer is reset at time T2 and time T3. If the SR timer times out and the UE receives no UL grant, the UE transmits an SR. For example, if the SR timer times out at time T4 and the UE receives no UL grant, the UE transmits an SR. Whether the UE transmits the URLLC service data and the BSR of the MBB service data on the grant-free resource depends on the size of the URLLC service data and the BSR of the MBB service data as well as the latency budget of the URLLC service data. Specifically, if the size of the URLLC service data and the BSR of the MBB service data is less than or equal to the size of the grant-free resource, the URLLC service data and the BSR of the MBB service data are transmitted on the grant-free resource; if the size of the URLLC service data and the BSR of the MBB service data is larger than the size of the grant-free resource, the latency budget of the URLLC service data should be further determined. If the URLLC service data is urgent, only the URLLC service data is transmitted on the grant-free resource; if the URLLC service data is not urgent, the BSR of the MBB service data and a part of the URLLC service data are transmitted on the grant-free resource. If the grant-free resource does not carry the BSR of the MBB service data, the UE transmits the SR as usual. If new URLLC uplink data arrives at the UE after the UE receives the UL grant, the newly arriving URLLC service data is transmitted on an uplink scheduling resource indicated by the UL grant, and the MBB service data is not transmitted.

Figure 17A:
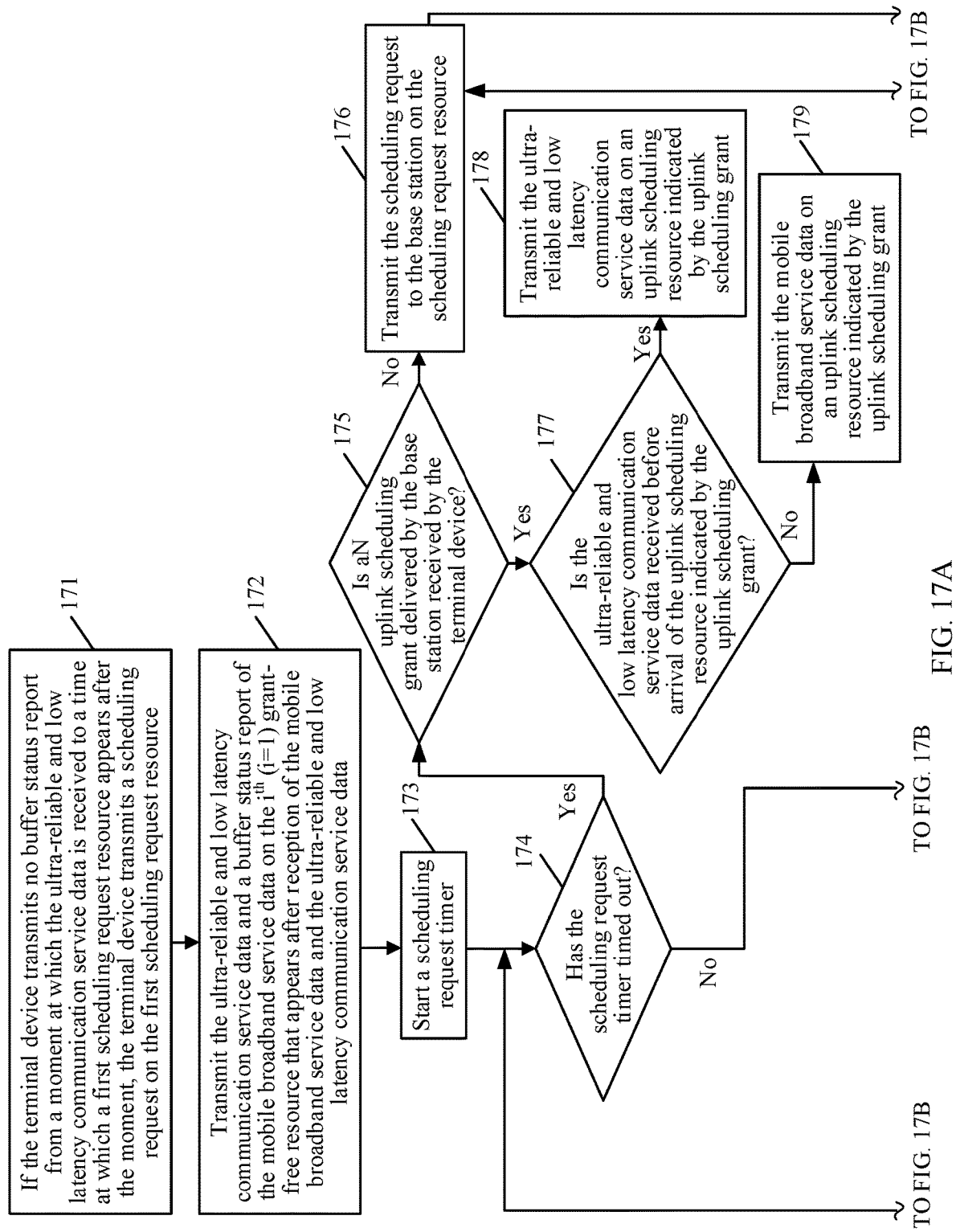
FIG. 17A and FIG. 17B are a schematic flowchart of yet another resource scheduling method according to an embodiment of this application.
Figure 17B:
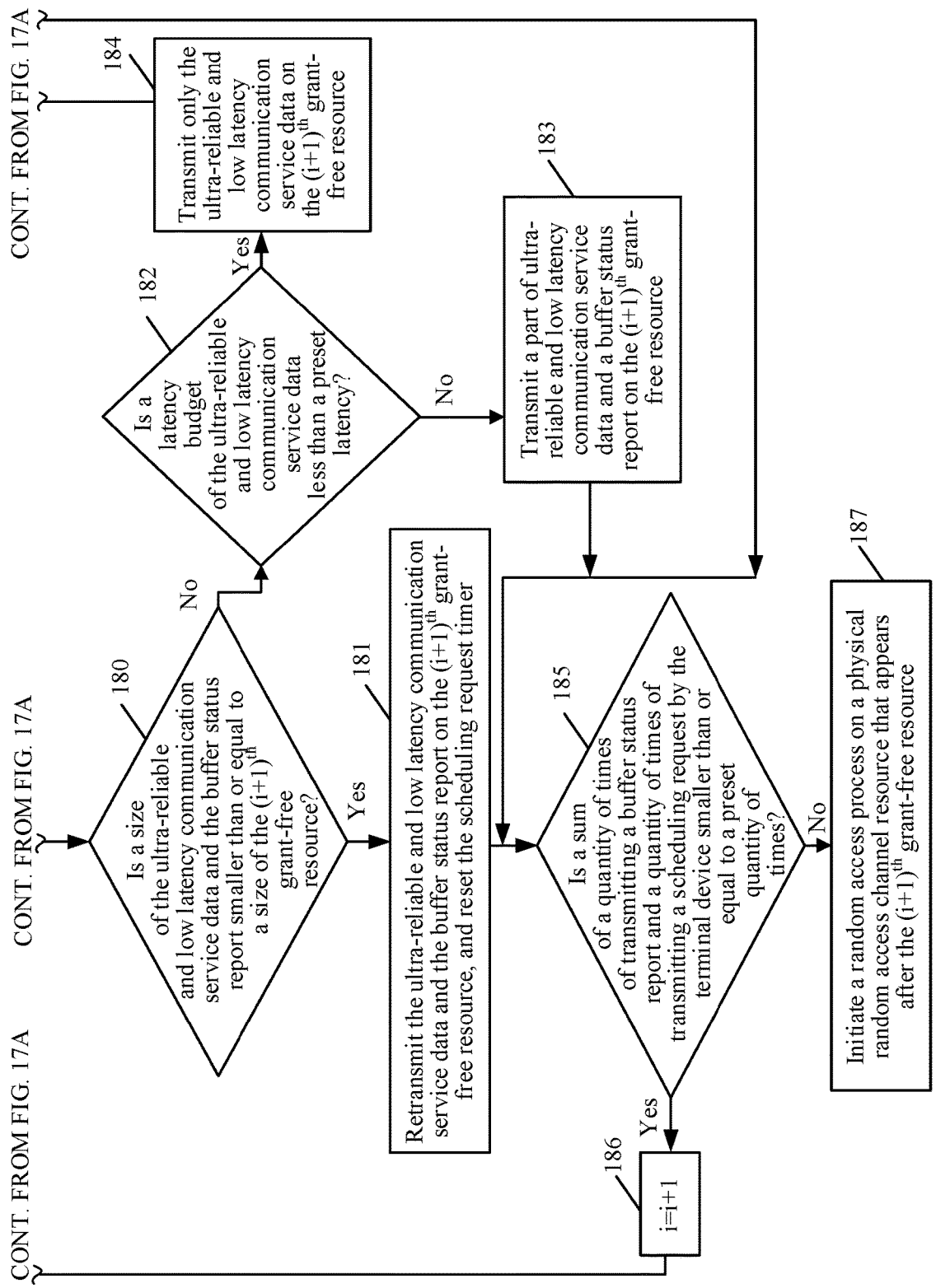

In the scenario shown in FIG. 16, the UE has both URLLC service data and MBB service data, and the base station preconfigures a grant-free resource for the UE. The grant-free resource may be shared by a plurality of UEs. As shown in FIG. 17A and FIG. 17B, a specific process of transmitting the URLLC service data and/or the MBB service data by the UE includes the following blocks.

Block 171: If the UE transmits no BSR from a moment at which the URLLC service data is received to a time at which a first SR resource appears after the moment, the UE transmits an SR on the first SR resource.

Block 172: The UE transmits the URLLC service data and a BSR of the MBB service data on the $i^{th}$ (i=1) grant-free resource that appears after reception of the MBB service data and the URLLC service data.

Block 173: The UE starts an SR timer.

Block 174: Determine whether the SR timer times out. If timeout occurs, perform block 175; or if no timeout occurs, perform block 176.

Block 175: Determine whether the UE receives a UL grant delivered by the base station. If the UL grant is received, perform block 177; or if no UL grant is received, perform block 176.

Block 176: The UE transmits the SR to the base station on the SR resource; and block 185 is performed.

Block 177: The UE determines whether URLLC service data is received before arrival of the uplink scheduling resource indicated by the UL grant. If the URLLC service data is received, block 178 is performed; or if no URLLC service data is received, block 179 is performed.

Block 178: Transmit the URLLC service data on the uplink scheduling resource indicated by the UL grant.

Block 179: Transmit the MBB service data on the uplink scheduling resource indicated by the UL grant.

Block 180: Determine whether the size of the URLLC service data and the BSR is less than or equal to the size of the $(i+1)^{th}$ grant-free resource. If the size of the URLLC service data and the BSR is less than or equal to the size of the $(i+1)^{th}$ grant-free resource, perform block 181; or if the size of the URLLC service data and the BSR is larger than the size of the $(i+1)^{th}$ grant-free resource, perform block 182.

Block 181: Retransmit the URLLC service data and the BSR on the $(i+1)^{th}$ grant-free resource, and reset the SR timer.

Block 182: Determine whether the latency budget of the URLLC service data is less than a preset latency, if the latency budget of the URLLC service data is less than the preset latency, perform block 184; or if the latency budget of the URLLC service data is not less than the preset latency, perform block 183.

Block 183: Transmit a part of URLLC service data and the BSR on the $(i+1)^{th}$ grant-free resource, and perform block 185.

Block 184: Transmit only the URLLC service data on the $(i+1)^{th}$ grant-free resource, and perform block 176.

Block 185: The UE determines whether a sum of a quantity of times of transmitting the BSR and a quantity of times of transmitting the SR is less than or equal to a preset quantity of times. If the sum is less than or equal to the preset quantity of times, block 186 is performed; or if the sum is larger than the preset quantity of times, block 187 is performed.

Block 186: When i=i+1, return to block 174.

Block 187: Initiate an RA process on a PRACH resource that appears after the $(i+1)^{th}$ grant-free resource.

In this embodiment of this application, the UE can transmit not only the URLLC service data but also the BSR of the MBB service data on the grant-free resource, thereby reducing the uplink transmission latency and fully using the grant-free resource.

Yet another possible scenario is that the UE has only URLLC service data. In this scenario, the first indication information is used to indicate a data volume of the second service data. The transmitting, by a terminal device, at least first indication information to a network device on a pre-allocated uplink resource includes: transmitting, by the terminal device, the first indication information and a part of the second service data to the network device on the pre-allocated uplink resource when a size of the pre-allocated uplink resource is smaller than a size of the second service data; or transmitting, by the terminal device, the second service data to the network device on the pre-allocated uplink resource if the size of the pre-allocated uplink resource is greater than or equal to a size of the second service data; and transmitting, by the terminal device, a remaining part of the second service data to the network device on a next pre-allocated uplink resource of the pre-allocated uplink resource or on a next uplink resource of the uplink resource when the size of the pre-allocated uplink resource is smaller than a size of the second service data. The following gives a detailed description with reference to FIG. 18.

Figure 18:
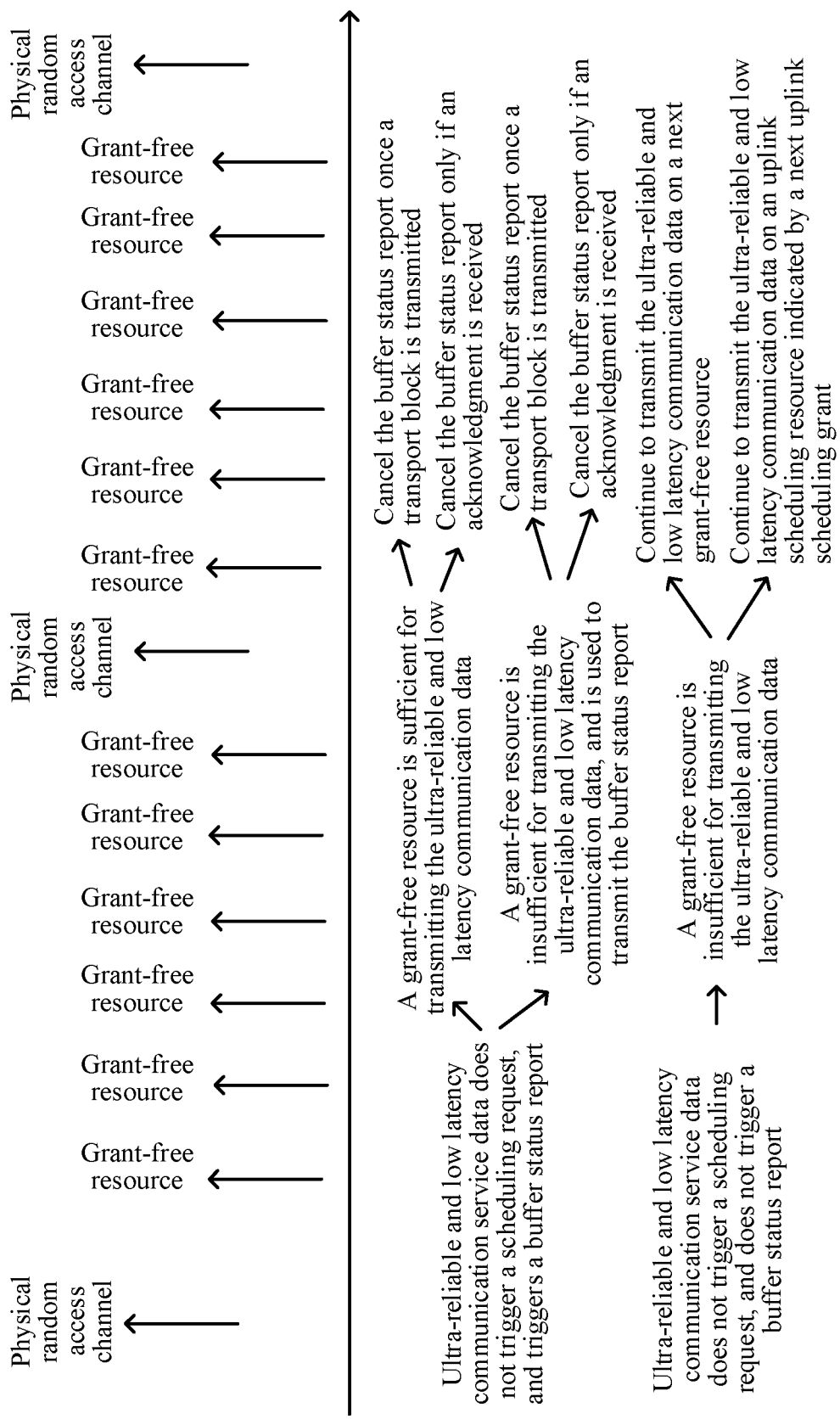
FIG. 18 is a schematic diagram of yet another scenario according to an embodiment of this application.

FIG. 18 is a schematic diagram of yet another scenario according to an embodiment of this application. As shown in FIG. 18, when the UE has only URLLC service data, the URLLC service data is transmitted by using only the grant-free resource. The URLLC service data can trigger a BSR, or may not trigger a BSR. The following describes the two cases separately.

A possible case is that the URLLC service data triggers a BSR.

In the scenario shown in FIG. 18, the UE has only URLLC service data, and the base station preconfigures a grant-free resource for the UE. The grant-free resource may be shared by a plurality of UEs. When the URLLC service data arrives at the UE side, if the URLLC service data triggers the BSR, the UE transmits the URLLC service data on the grant-free resource that appears after reception of the URLLC service data. Specifically, the UE compares the size of a current grant-free resource and the size of the URLLC service data. If the size of the URLLC service data is larger than the size of the current grant-free resource, the UE transmits a part of the URLLC service data and the BSR on the current grant-free resource, and transmits remaining URLLC service data on a next grant-free resource. If the size of the URLLC service data is less than or equal to the size of the current grant-free resource, the UE transmits all URLLC service data on the current grant-free resource. The BSR may be alternatively cancelled. A specific cancellation manner may be: The UE cancels the BSR after transmitting a transport block (TB) to the base station, or the UE transmits a TB to the base station and cancels the BSR after receiving an acknowledgement feedback from the base station on the TB.

Another possible scenario is that the URLLC service data does not trigger a BSR.

In the scenario shown in FIG. 18, the UE has only URLLC service data, and the base station preconfigures a grant-free resource for the UE. The grant-free resource may be shared by a plurality of UEs. When the URLLC service data arrives at the UE side, if the URLLC service data does not trigger the BSR, the UE transmits the URLLC service data on the grant-free resource that appears after reception of the URLLC service data. Specifically, the UE compares a size of a current grant-free resource and the size of the URLLC service data. If the size of the URLLC service data is larger than the size of the current grant-free resource, the UE transmits a part of the URLLC service data on the current grant-free resource, and transmits remaining URLLC service data on a next grant-free resource or on an uplink scheduling resource indicated by the UL grant. If the size of the URLLC service data is less than or equal to the size of the current grant-free resource, the UE transmits all URLLC service data on the current grant-free resource.

In this embodiment of this application, the UE transmits the URLLC service data on the grant-free resource, and whether the URLLC service data triggers the BSR is configurable. As the URLLC service data does not trigger the SR, the uplink transmission latency of the URLLC service data is reduced and the grant-free resource is fully used.

It should be noted that in the embodiments corresponding to FIG. 8, FIG. 9, FIG. 10, FIG. 11A, FIG. 11B, FIG. 14, FIG. 15, FIG. 16, FIG. 17A, and FIG. 17B, the SR is counted by using the quantity of times of transmitting the SR. The embodiments of this application do not limit the manner of counting the SR. In other embodiments, the SR may be counted by using a quantity of times an SR resource appears.

In the foregoing embodiment, conditions of canceling the SR include the following possible cases:

A possible case is that the SR is cancelled only if any one of the following conditions is met:

the BSR is transmitted on a non-conflicting resource, and the BSR includes data volume information of a service that triggers the SR; and the BSR is transmitted on a conflicting resource, and the BSR includes the data volume information of the service that triggers the SR, and an acknowledgement feedback is received from a receiving party.

Another possible case is that transmission of the SR is suspended when the following condition is met:

the BSR is transmitted on a conflicting resource, and the BSR includes data volume information of a service that triggers the SR.

Figure 19:
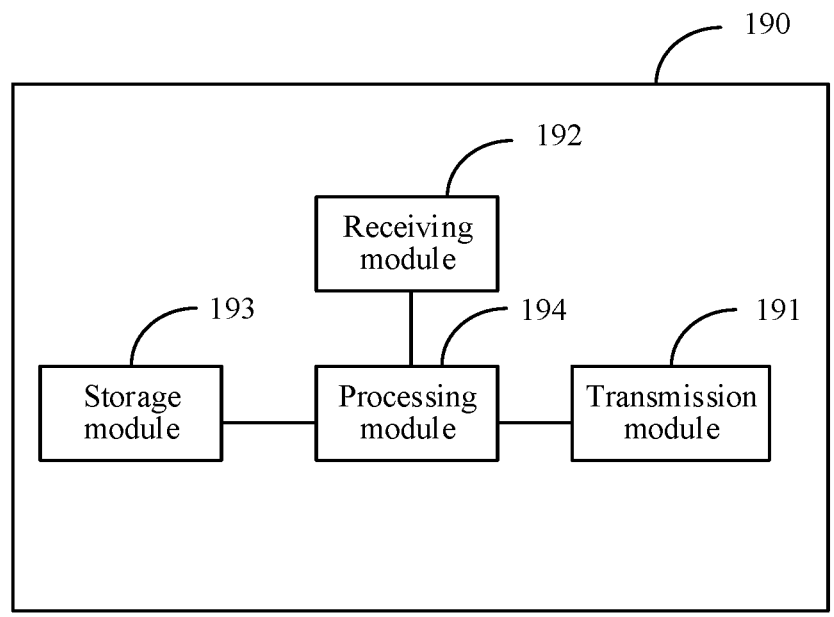
FIG. 19 is a schematic structural diagram of a terminal device according to an embodiment of this application.

FIG. 19 is a schematic structural diagram of a terminal device according to an embodiment of this application. As shown in FIG. 19, the terminal device 190 includes a transmission module 191 and a receiving module 192. The transmission module 191 is configured to transmit at least first indication information to a network device on a pre-allocated uplink resource, where the first indication information is used to indicate a data volume of to-be-transmitted data of the terminal device. When the receiving module 192 receives at least second indication information transmitted by the network device, where the second indication information is used to indicate an uplink resource allocated by the network device to the terminal device, the transmission module 191 is further configured to transmit the to-be-transmitted data on the uplink resource.

In FIG. 19, further, the terminal device also includes a storage module 193. If the storage module 193 stores first service data and a pre-allocated uplink resource corresponding to the terminal device is used to transmit at least the first indication information, the transmission module 191 transmits the first indication information to the network device on the pre-allocated uplink resource.

In the foregoing embodiment, the first indication information is used to indicate a data volume of the first service data.

In the foregoing embodiment, the transmission module 191 retransmits the first indication information on a next pre-allocated uplink resource if the second indication information transmitted by the network device is not received by the receiving module 192 before arrival of the next pre-allocated uplink resource of the pre-allocated uplink resource.

In FIG. 19, further, the terminal device also includes a processing module 194. If a quantity of times of transmitting the first indication information by the transmission module 191 reaches a preset quantity of times, the processing module 194 is configured to initiate a random access process through the transmission module 191.

Alternatively, if the second indication information transmitted by the network device is not received by the receiving module 192 when a quantity of times of transmitting the first indication information by the transmission module 191 reaches a preset quantity of times, the processing module 194 is configured to initiate a random access process through the transmission module 191.

In the foregoing embodiment, after transmitting at least the first indication information to the network device on the pre-allocated uplink resource, the transmission module 191 is further configured to transmit scheduling request information to the network device on a scheduling request resource allocated by the network device. The transmission module 191 is further configured to retransmit the first indication information on a next pre-allocated uplink resource if the second indication information transmitted by the network device is not received by the receiving module 192 before arrival of the next pre-allocated uplink resource of the pre-allocated uplink resource. The transmission module 191 is further configured to retransmit the scheduling request information on a next scheduling request resource if the second indication information transmitted by the network device is not received by the receiving module 192 before arrival of the next scheduling request resource of the scheduling request resource.

In the foregoing embodiment, if a quantity of times of transmitting the first indication information by the transmission module 191 reaches a preset quantity of times, the transmission module 191 transmits scheduling request information to the network device on a scheduling request resource allocated by the network device.

Alternatively, if the second indication information transmitted by the network device is not received by the receiving module 192 when a quantity of times of transmitting the first indication information by the transmission module 191 reaches a preset quantity of times, the transmission module 191 transmits scheduling request information to the network device on a scheduling request resource allocated by the network device.

In the foregoing embodiment, the transmission module 191 is specifically configured to transmit the first indication information and a part of the first service data to the network device on the pre-allocated uplink resource.

In the foregoing embodiment, the transmission module 191 retransmits the first indication information and the part of the first service data on a next pre-allocated uplink resource if the second indication information transmitted by the network device is not received by the receiving module 192 before arrival of the next pre-allocated uplink resource of the pre-allocated uplink resource.

In the foregoing embodiment, if a quantity of times of transmitting the first indication information and the part of the first service data by the transmission module 191 reaches a preset quantity of times, the processing module 194 is configured to initiate a random access process through the transmission module 191.

Alternatively, if the second indication information transmitted by the network device is not received by the receiving module 192 when a quantity of times of transmitting the first indication information and the part of the first service data by the transmission module 191 reaches a preset quantity of times, the processing module 194 is configured to initiate a random access process through the transmission module 191.

In the foregoing embodiment, the transmission module 191 is specifically configured to transmit second service data and the first indication information to the network device on the pre-allocated uplink resource, where a priority of the second service data is higher than a priority of the first service data.

In the foregoing embodiment, after the transmission module 191 transmits the second service data and the first indication information to the network device on the pre-allocated uplink resource, if the second indication information transmitted by the network device is not received by the receiving module 192 in a preset time period, the transmission module 191 transmits scheduling request information to the network device on a scheduling request resource allocated by the network device; if the receiving module 192 receives a next pre-allocated uplink resource of the pre-allocated uplink resource in a preset time period, the processing module 194 determines whether to retransmit the second service data and the first indication information on the next pre-allocated uplink resource through the transmission module 191.

In the foregoing embodiment, if a sum of a quantity of times of transmitting the first indication information by the transmission module 191 and a quantity of times of transmitting the scheduling request information reaches a preset quantity of times, the processing module 194 initiates a random access process through the transmission module 191.

Alternatively, if the second indication information transmitted by the network device is not received by the receiving module 192 when a sum of a quantity of times of transmitting the first indication information by the transmission module 191 and a quantity of times of transmitting the scheduling request information reaches a preset quantity of times, the processing module 194 initiates a random access process through the transmission module 191.

In the foregoing embodiment, the first indication information is used to indicate a data volume of the second service data.

In the foregoing embodiment, the first service data includes at least mobile broadband MBB service data, and the second service data includes at least ultra-reliable low latency communication URLLC service data.

The terminal device of the embodiment shown in FIG. 19 may be configured to execute the technical solutions of the foregoing method embodiments. Their implementation principles and technical effects are similar, and are not further described herein.

It should be understood that the foregoing modules of the terminal device are merely divided in terms of logical functions, and in actual implementation, may be integrated into one physical entity in full or in part, or may be physically separated. In addition, all the units may be implemented in a form of software invoking a processing element, or may be implemented in a form of hardware; some units may be implemented in a form of software invoking a processing element, and some units are implemented in a form of hardware. For example, the processing module 194 may be a processing component separately disposed, or may be integrated in a chip of the terminal device, or may be stored in a memory of the terminal device in the form of a program so that the program can be invoked by a processing component of the terminal device to perform a function of each module described above. Implementation of other units is similar to this. In addition, all or some of the units may be integrated together, or may be implemented independently. The processing element may be an integrated circuit and has a signal processing capability. In an implementation process, steps in the foregoing methods or the foregoing modules can be implemented by using a hardware integrated logical circuit in the processing element, or by using instructions in a form of software.

For example, the foregoing units may be one or more integrated circuits configured to implement the foregoing method, for example, one or more application-specific integrated circuits (ASIC), one or more microprocessors (DSP), or one or more field programmable gate arrays (FPGA). In another example, when one of the foregoing units is implemented in a form of a processing element scheduling a program, the processing element may be a general purpose processor, for example, a central processing unit (CPU) or another processor that can invoke a program. In another example, these units may be integrated together and implemented in a system-on-a-chip (SOC) form.

Figure 20:
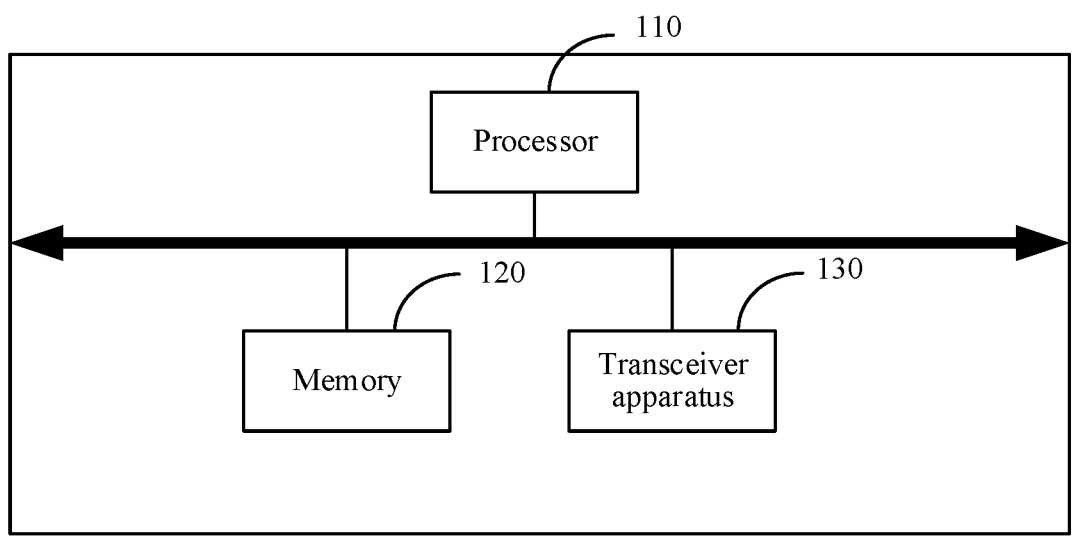
FIG. 20 is a schematic structural diagram of another terminal device according to an embodiment of this application.

FIG. 20 is a schematic structural diagram of another terminal device according to an embodiment of this application. As shown in FIG. 20, the terminal device 200 includes a processor 110, a memory 120, and a transceiver apparatus 130. The transceiver apparatus 130 may be connected to an antenna. In a downlink direction, the transceiver apparatus 130 receives, through the antenna, information transmitted by the base station, and transmits the information to the processor 110 for processing. In an uplink direction, the processor 110 processes data of the terminal and transmits the data to the base station through the transceiver apparatus 130.

The memory 120 is configured to store a program for implementing the foregoing method embodiments or each module in the embodiment shown in FIG. 19. The processor 110 invokes the program to perform operations of the foregoing method embodiments and implement each module shown in FIG. 19.

Alternatively, some or all of the foregoing modules may also be implemented by being embedded in a chip of the terminal in the form of an integrated circuit, and may be implemented separately or may be integrated together. To be specific, the foregoing units may be configured as one or more integrated circuits, for example, one or more application-specific integrated circuits (ASIC), one or more microprocessors (DSP), or one or more field programmable gate arrays (FPGA), to perform the foregoing method.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method, comprising:
    transmitting, by a terminal device, at least first indication information to a network device on a pre-allocated uplink resource if a buffer of the terminal device comprises first service data and the pre-allocated uplink resource corresponding to the terminal device is used to transmit at least the first indication information, wherein the first indication information indicates a data volume of all data in a data buffer of the terminal device including to-be-transmitted data of the terminal device;
    transmitting, by the terminal device, the to-be-transmitted data on an uplink resource if the terminal device receives at least second indication information transmitted by the network device, wherein the second indication information indicates the uplink resource allocated by the network device to the terminal device;
    retransmitting, by a terminal device, the first indication information on a next pre-allocated uplink resource if the second indication information transmitted by the network device is not received by the terminal device before arrival of the next pre-allocated uplink resource of the pre-allocated uplink resource; and
    initiating, by a terminal device, a random access process if a quantity of times of transmitting the first indication information by the terminal device reaches a preset quantity of times.

2. The method according to claim 1, wherein the first indication information indicates a data volume of the first service data.

3. The method according to claim 1, wherein after the transmitting, by a terminal device, at least first indication information to a network device on a pre-allocated uplink resource, the method further comprises:
- transmitting, by the terminal device, scheduling request information to the network device on a scheduling request resource allocated by the network device;
- retransmitting, by a terminal device, the first indication information on a next pre-allocated uplink resource if the second indication information transmitted by the network device is not received by the terminal device before arrival of the next pre-allocated uplink resource of the pre-allocated uplink resource; and
- retransmitting, by a terminal device, the scheduling request information on a next scheduling request resource if the second indication information transmitted by the network device is not received by the terminal device before arrival of the next scheduling request resource of the scheduling request resource.

4. The method according to claim 1, further comprising:
- transmitting, by a terminal device, if a quantity of times of transmitting the first indication information by the terminal device reaches a preset quantity of times, scheduling request information to the network device on a scheduling request resource allocated by the network device.

5. The method according to claim 1, wherein the transmitting, by a terminal device, at least first indication information to a network device on a pre-allocated uplink resource comprises:
- transmitting, by the terminal device, second service data and the first indication information to the network device on the pre-allocated uplink resource, wherein a priority of the second service data is higher than a priority of the first service data.

6. The method according to claim 1, wherein the first indication information indicates a data volume of the second service data.

7. An apparatus, comprising a processor and a memory having instructions, wherein the instructions are performed by the processor to cause the apparatus to:
- transmit at least first indication information to a network device on a pre-allocated uplink resource if a buffer of the apparatus comprises first service data and the pre-allocated uplink resource corresponding to the apparatus is used to transmit at least the first indication information, wherein the first indication information indicates a data volume of all data in a data buffer of the terminal device including to-be-transmitted data of the apparatus;
- transmit the to-be-transmitted data on the uplink resource if the apparatus receives at least second indication information transmitted by the network device, wherein the second indication information indicates the uplink resource allocated by the network device to the apparatus;
- retransmit the first indication information on a next pre-allocated uplink resource if the second indication information transmitted by the network device is not received by the apparatus before arrival of the next pre-allocated uplink resource of the pre-allocated uplink resource; and
- initiate a random access process if a quantity of times of transmitting the first indication information by the apparatus reaches a preset quantity of times.

8. The apparatus according to claim 7, wherein the first indication information indicates a data volume of the first service data.

9. The apparatus according to claim 7, wherein the instructions further cause the apparatus to:
- transmit scheduling request information to the network device on a scheduling request resource allocated by the network device after transmitting at least first indication information to a network device on a pre-allocated uplink resource;
- retransmit the first indication information on a next pre-allocated uplink resource if the second indication information transmitted by the network device is not received by the apparatus before arrival of the next pre-allocated uplink resource of the pre-allocated uplink resource; and
- retransmit the scheduling request information on a next scheduling request resource if the second indication information transmitted by the network device is not received by the apparatus before arrival of the next scheduling request resource of the scheduling request resource.

10. The apparatus according to claim 7, wherein the instructions further cause the apparatus to:
- transmit if a quantity of times of transmitting the first indication information by the apparatus reaches a preset quantity of times, scheduling request information to the network device on a scheduling request resource allocated by the network device.

11. The apparatus according to claim 7, wherein the transmitting at least first indication information to a network device on a pre-allocated uplink resource comprises:
- transmitting second service data and the first indication information to the network device on the pre-allocated uplink resource, wherein a priority of the second service data is higher than a priority of the first service data.

12. The apparatus according to claim 7, wherein the first indication information indicates a data volume of the second service data.

13. A non-transitory computer-readable medium storing instructions which, when executed by one or more processors, cause the one or more processors to perform a method comprising:
- transmitting, by a terminal device, at least first indication information to a network device on a pre-allocated uplink resource if a buffer of the terminal device comprises first service data and the pre-allocated uplink resource corresponding to the terminal device is used to transmit at least the first indication information, wherein the first indication information indicates a data volume of all data in a data buffer of the terminal device including to-be-transmitted data of the terminal device;
- transmitting, by the terminal device, the to-be-transmitted data on an uplink resource if the terminal device receives at least second indication information transmitted by the network device, wherein the second indication information indicates the uplink resource allocated by the network device to the terminal device;
- retransmitting, by a terminal device, the first indication information on a next pre-allocated uplink resource if the second indication information transmitted by the network device is not received by the terminal device before arrival of the next pre-allocated uplink resource of the pre-allocated uplink resource; and initiating, by a terminal device, a random access process if a quantity of times of transmitting the first indication information by the terminal device reaches a preset quantity of times.

14. The non-transitory computer-readable medium of claim 13, wherein the first indication information indicates a data volume of the first service data.

15. The non-transitory computer-readable medium of claim 13, wherein the transmitting, by a terminal device, at least first indication information to a network device on a pre-allocated uplink resource comprises:

transmitting, by the terminal device, second service data and the first indication information to the network device on the pre-allocated uplink resource, wherein a priority of the second service data is higher than a priority of the first service data.

16. The non-transitory computer-readable medium of claim 15, wherein the first indication information indicates a data volume of the second service data.

* * * * *